US010290222B2

(12) United States Patent
Rubalcaba et al.

(10) Patent No.: US 10,290,222 B2
(45) Date of Patent: May 14, 2019

(54) INTERACTIVE TUTORIAL WITH INTEGRATED ESCALATING PROMPTS

(71) Applicants: Maria Rubalcaba, Duarte, CA (US); John Mina, West Hills, CA (US)

(72) Inventors: Maria Rubalcaba, Duarte, CA (US); John Mina, West Hills, CA (US)

(73) Assignee: Visautact LLC, West Hills, CA (US)

( * ) Notice: Subject to any disclaimer, the term of this patent is extended or adjusted under 35 U.S.C. 154(b) by 212 days.

(21) Appl. No.: 15/196,403

(22) Filed: Jun. 29, 2016

(65) Prior Publication Data

US 2017/0084189 A1 Mar. 23, 2017

Related U.S. Application Data

(60) Provisional application No. 62/221,202, filed on Sep. 21, 2015.

(51) Int. Cl.
| | |
|---|---|
| *G09B 7/04* | (2006.01) |
| *G09B 17/00* | (2006.01) |
| *G09B 19/00* | (2006.01) |
| *G09B 19/06* | (2006.01) |
| *G09B 7/08* | (2006.01) |
| *G09B 19/04* | (2006.01) |
| *G09B 7/02* | (2006.01) |
| *G09B 21/00* | (2006.01) |

(52) U.S. Cl.
CPC ............... *G09B 7/04* (2013.01); *G09B 7/02* (2013.01); *G09B 7/08* (2013.01); *G09B 17/006* (2013.01); *G09B 19/00* (2013.01); *G09B 19/0076* (2013.01); *G09B 19/04* (2013.01); *G09B 19/06* (2013.01); *G09B 21/009* (2013.01)

(58) Field of Classification Search
None
See application file for complete search history.

(56) References Cited

U.S. PATENT DOCUMENTS

| | | | | |
|---|---|---|---|---|
| 6,729,884 | B1* | 5/2004 | Kelton | G09B 23/28 434/236 |
| 7,402,105 | B1* | 7/2008 | Hutter | A63F 13/12 434/128 |
| 9,053,640 | B1* | 6/2015 | Hendricks | G06F 17/21 |
| 2002/0086272 | A1* | 7/2002 | Ho | G09B 5/06 434/236 |
| 2002/0168621 | A1* | 11/2002 | Cook | G09B 7/00 434/350 |
| 2004/0067469 | A1* | 4/2004 | Rogan | A63F 13/12 434/107 |
| 2006/0040244 | A1* | 2/2006 | Kain | G09B 9/00 434/247 |

(Continued)

*Primary Examiner* — Jason T Yen

(57) ABSTRACT

In one embodiment, an instructional method for assisting a student to learn at least one skill comprises selecting an interactive tutorial, the interactive tutorial including a plurality of images that represent a series of actions to be performed to learn the at least one skill; identifying a virtual character to be instantiated in the interactive tutorial; presenting the interactive tutorial to the student on a display; monitoring an ability of the student to follow the interactive tutorial, the monitoring being concurrent with the presenting of the interactive tutorial; and dynamically adapting the interactive tutorial based on the ability of the student to follow the interactive tutorial.

19 Claims, 23 Drawing Sheets

(56) References Cited

U.S. PATENT DOCUMENTS

| | | | |
|---|---|---|---|
| 2007/0082324 A1* | 4/2007 | Johnson | G09B 7/02 |
| | | | 434/156 |
| 2007/0202484 A1* | 8/2007 | Toombs | G09B 7/00 |
| | | | 434/350 |
| 2010/0197463 A1* | 8/2010 | Haughay, Jr. | A63B 24/0062 |
| | | | 482/8 |
| 2015/0182130 A1* | 7/2015 | Utter, II | A61B 5/0205 |
| | | | 600/483 |
| 2016/0225273 A1* | 8/2016 | Baruah | G09B 7/02 |
| 2017/0046971 A1* | 2/2017 | Moreno | G09B 19/00 |

* cited by examiner

| 206 Parent #1 - 202 | |
|---|---|
| Picture Upload: | Yes |
| Gender: | --- |
| Hair Type: | --- |
| Hair Color: | --- |
| Skin Color: | --- |
| Facial Hair: | --- |
| Eye Color: | --- |
| Body Type: | Slender |
| Clothes: | Blue Dress |
| Shoes: | Pink Sneakers |
| Language: | English |
| Mood: | Happy |

| 206 Parent #2 - 204 | |
|---|---|
| Picture Upload: | No |
| Gender: | Male |
| Hair Type: | Short, Straight |
| Hair Color: | Black |
| Skin Color: | Tan |
| Facial Hair: | Short Mustache |
| Eye Color: | Blue |
| Body Type: | Slender |
| Clothes: | Blue T-Shirt, Jeans |
| Shoes: | Black Flip Flops |
| Language: | Spanish |
| Mood: | Serious |

| 206 Counselor - 210 | |
|---|---|
| Picture Upload: | Yes |
| Gender: | --- |
| Hair Type: | --- |
| Hair Color: | --- |
| Skin Color: | --- |
| Facial Hair: | --- |
| Eye Color: | --- |
| Body Type: | Stocky |
| Clothes: | Red T-Shirt, Blue Shorts |
| Shoes: | High Heels |
| Language: | English |
| Mood: | Happy |

| 206 User - 212 | |
|---|---|
| Picture Upload: | Yes |
| Gender: | --- |
| Hair Type: | --- |
| Hair Color: | --- |
| Skin Color: | --- |
| Facial Hair: | --- |
| Eye Color: | --- |
| Body Type: | Slender |
| Clothes: | Black T-shirt, White Shorts |
| Shoes: | Red Flip Flops |
| Language: | English |
| Mood: | Happy |

| 206 Friend #1 - 214a | |
|---|---|
| Picture Upload: | No |
| Gender: | Male |
| Hair Type: | Short |
| Hair Color: | Black |
| Skin Color: | White |
| Facial Hair: | None |
| Eye Color: | Green |
| Body Type: | Muscular |
| Clothes: | Work out wear |
| Shoes: | Black sneakers |
| Language: | Spanish |
| Mood: | Worried |

| 206 Friend #2 - 214b | |
|---|---|
| Picture Upload: | Yes |
| Gender: | --- |
| Hair Type: | --- |
| Hair Color: | --- |
| Skin Color: | --- |
| Facial Hair: | --- |
| Eye Color: | --- |
| Body Type: | Slender |
| Clothes: | Yellow Dress |
| Shoes: | White Dress Shoes |
| Language: | English |
| Mood: | Sad |

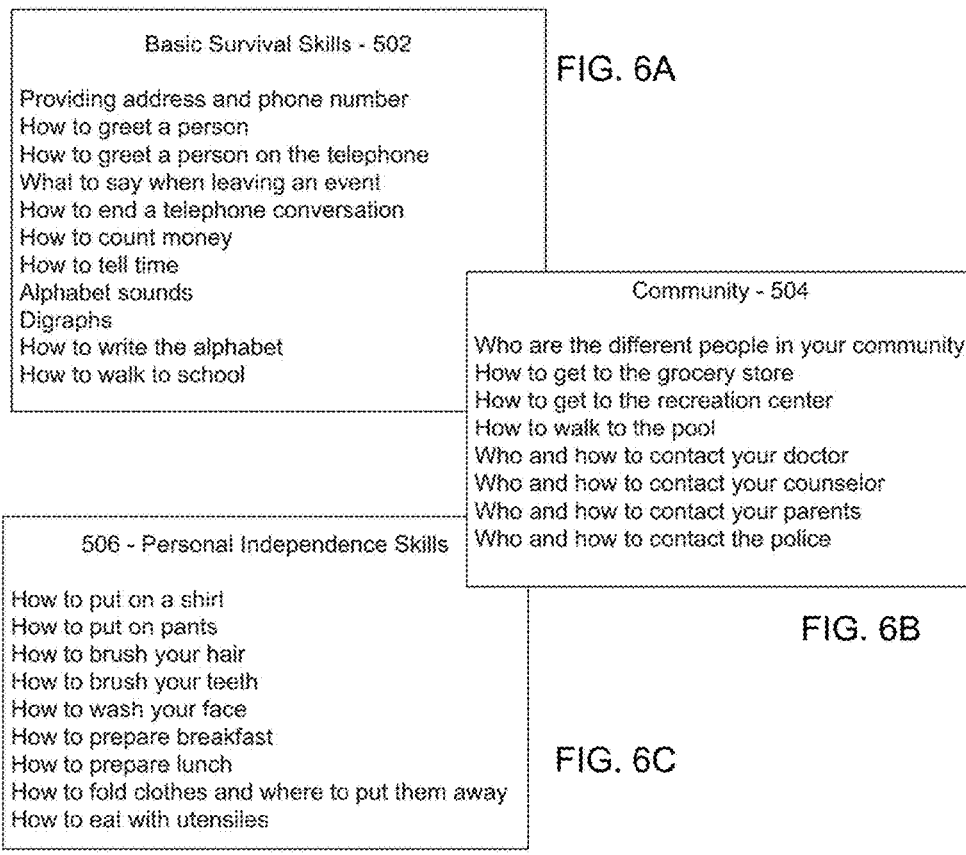
FIG. 6A
FIG. 6B
FIG. 6C
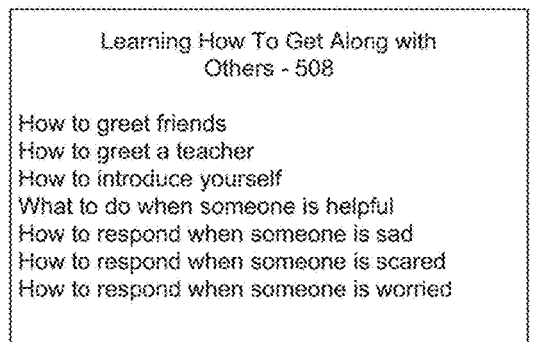
FIG. 6D

INTERACTIVE TUTORIAL WITH INTEGRATED ESCALATING PROMPTS

CROSS-REFERENCE TO RELATED APPLICATION

This application claims priority benefit of U.S. Provisional Patent Application No. 62/221,202, filed on Sep. 21, 2015, and entitled "VisAuTact provides virtual/interactive speech language therapy utilizing visual/auditory/tactile prompting in gaming software," which is hereby incorporated herein by reference.

BACKGROUND OF THE INVENTION

A person may require therapy due to a number of disabilities. For example, a person may have had a stroke, head trauma, autism, asperger syndrome, Alzheimer's disease and dementia, or any number of other disabilities. The person may then have to learn or re-learn basic skills such as how to speak, dress oneself, basic social skills, reading, writing, eating, or any number of other skills.

However, traditional therapy methods are expensive, inefficient, and there is a shortage of therapists to treat and meet the needs of the rising number of patients. Current software, applications, games, books and activities, and hands-on therapy improves a student's ability to perform task through memorization. In other words, patients become robots by memorizing the answers or motions and responding only how they have been programmed to respond.

Current therapy software applications also do not teach a higher level of thinking. The software applications simply ask "yes" or "no" questions and/or present multiple choice answers. Thus, as long as the patient memorizes the answer, they are able to continue to the next task. However, there is no high level thinking and therefore, the patient has truly not mastered the skill. Moreover, once the patient leaves the therapist's office, the learned skills rarely carry over to the patient's home thereby making progress difficult and slow.

OVERVIEW

An interactive tutorial with escalating prompts can replicate real-life situations via use of personalized virtual characters and environments or settings. Furthermore, the interactive tutorial can teach skills through active participation by requiring the user to utilize multiple senses such as visual, auditory, and tactile, kinesthetic, and proprioceptive senses.

In one embodiment, an instructional method for assisting a student to learn at least one skill comprises selecting an interactive tutorial, the interactive tutorial including a plurality of images that represent a series of actions to be performed to learn the at least one skill; identifying a virtual character to be instantiated in the interactive tutorial; presenting the interactive tutorial to the student on a display; monitoring an ability of the student to follow the interactive tutorial, the monitoring being concurrent with the presenting of the interactive tutorial; and dynamically adapting the interactive tutorial based on the ability of the student to follow the interactive tutorial.

In another embodiment, a non-transitory computer readable medium including at least computer program code stored thereon for assisting a user to learn at least one skill, the non-transitory computer readable medium comprising: computer program code for selecting an interactive tutorial, the interactive tutorial including at least (i) a plurality of images that represent a series of actions to be performed to learn the at least one skill, (ii) audio that provides instructions on performing the series of actions to be performed to least the at least one skill, and a plurality of prompts for at least one of the actions, the plurality of prompts for the at least one of the actions being arranged to provide different levels of guidance; computer program code for identifying a virtual character to be instantiated in the interactive tutorial, the virtual character is learning the at least one skill; computer program code for presenting the interactive tutorial to the user using a display and a speaker; computer program code for monitoring an ability of the user to follow the interactive tutorial, the monitoring being concurrent with the presenting of the interactive tutorial, and the monitoring operates to monitor actions, if any, performed by the user in response to audio or visual instructions presented to the user by the interactive tutorial; and computer program code for dynamically adapting the interactive tutorial based on the ability of the user to follow the interactive tutorial, the computer program code for dynamically adapting the interactive tutorial includes at least computer program code for sequentially progressing through the plurality of prompts presented to the user to offer increasing level of guidance based on the ability of the user to follow the interactive tutorial including any of the prompts previously presented.

In still another embodiment, a computing device configured to assist a user in learning a skill, the computing device comprises at least one data storage device that stores an electronic tutorial that contains audio instructional content and video instructional content; a display device that presents the video instructional content; a speaker that presents the audio instructional content; a least one sensor device to sense actions of the user while the electronic tutorial is being presented via the display device and/or the at least one sensor device; a prompt manager that evaluate ability of the user to perform the skill and to determine a guidance prompt to be presented to the user within the video instructional content and/or the audio instructional content, the guidance prompt being determined based on the evaluated ability of the user to perform the skill, and the evaluated ability of the user to perform the skill being based at least in part on data obtained by the at least one sensor.

The present invention provides other hardware configured to perform the methods of the invention, as well as software stored in a machine-readable medium (e.g., a tangible storage medium) to control devices to perform these methods.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings:

FIGS. 2A-2G illustrate example embodiments of virtual character tables.

FIGS. 6A-6D illustrate example skills taught in the interactive tutorials.

DESCRIPTION OF EXAMPLE EMBODIMENTS

Embodiments are described herein in the context of an interactive tutorial with integrated escalating prompts. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1A:
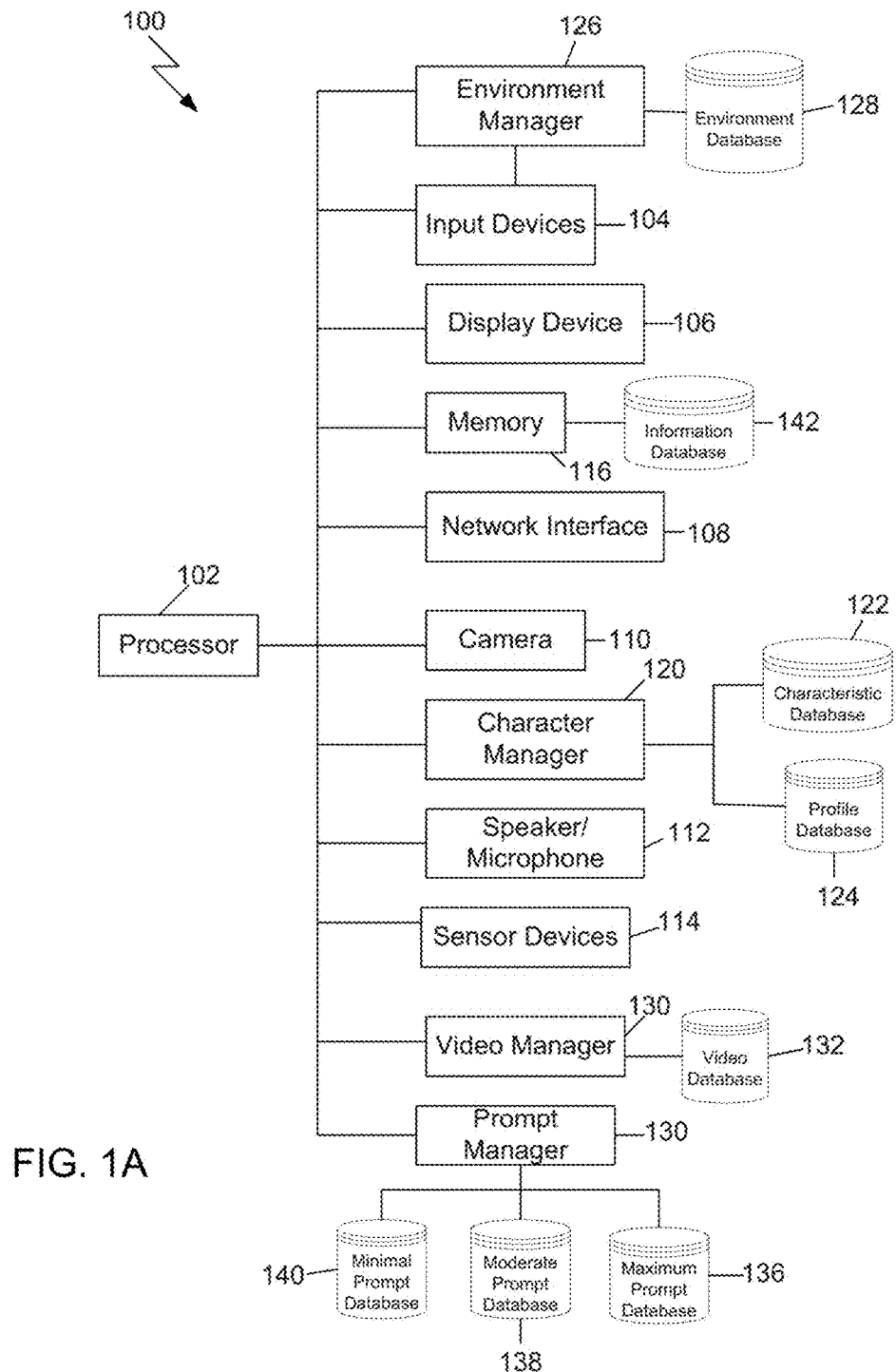
FIGS. 1A-1B illustrate example embodiments of an interactive tutorial with integrated escalating prompts.
Figure 1B:
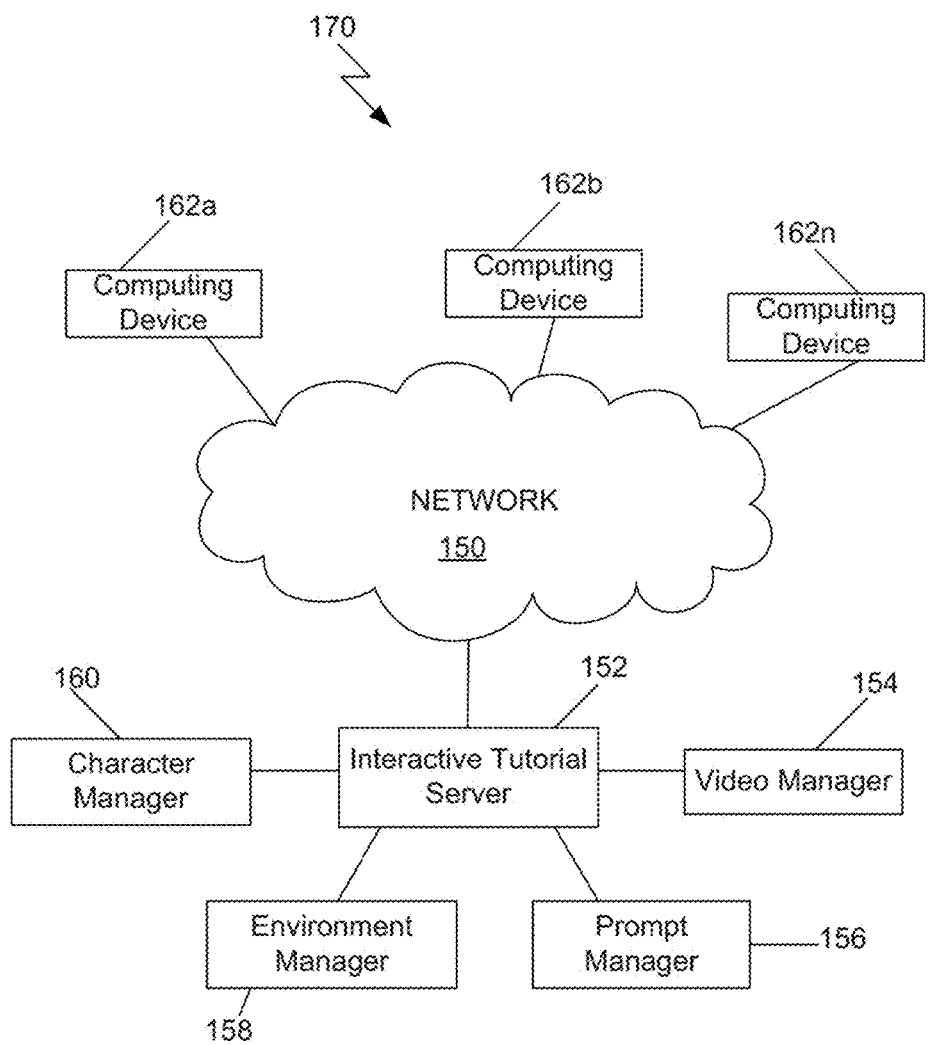

FIGS. 1A-1B illustrate example embodiments of an interactive tutorial with integrated escalating prompts. The interactive tutorial can replicate real-life situations via use of personalized virtual characters and environments or settings. Furthermore, the interactive tutorial can teach skills through active participation by requiring the user to utilize multiple senses such as visual, auditory, and tactile, kinesthetic, and proprioceptive senses. In one embodiment, the interactive tutorial may incorporate the principals of speech and language pathology, including, but not limited to semantics, syntax, morphology, pragmatics, articulation, fluency, and cognition. Referring to FIG. 1A, the interactive tutorial 100, may be run on any portable or non-portable computing device having a processor 102. The computing device may be any computing device such as a mobile telephone, desktop computers, wearable computing devices, projectors, tablet, netbook, interactive television, laptop, gaming devices (i.e. Kinect™' Playstation™, Xbox™, and the like), and the like. Although illustrated with one processor 102, this is not intended to be limiting as any number of processors may be used to carry out the invention. In another embodiment, more than one computing device or servers may be used to run the interactive tutorial interactive tutorial, as illustrated in FIG. 1B.

Processor 102 may be configured to communicate with an input device 104, display device 106, network interface 108, camera 110, speaker and microphone 112, and sensor devices 114. Input device 104 may be any device to receive and transmit an input such as a keyboard, touch panel, mouse, external buttons and switches, and the like. Display device 106 may be any type of display to present graphical user interfaces, images, or videos to the user, such as a display screen or a touch screen. Network interface 108 may be any wired or wireless connection used to communicate with any other device, server, or network using any known communication methods such as peer-to-peer network, wide area network (WAN), local area network (LAN), WiFi, and the like. Camera 110 may be any image capturing device to capture images such as the user's picture or a setting such as a classroom. Speaker and microphone 112 may be any audio capturing devices to input and output sounds and audio. Sensor devices 114 may be any device used to capture electrical or optical signals or gestures that detect movement or changes in the environment or person. For example, motion sensing devices may be placed on the user's body and/or objects used to learn the skill in the interactive tutorial. In another example, motion may be detected using a camera 110 without the user of sensing devices placed on the user's body. Sensor devices 114 or camera 110 may be used to detect the user's movements or selection of objects.

Interactive tutorial 100 can have a memory 116 to store any desired information, such as an application to run the interactive tutorial. The application may be able to run on any known web applications and/or mobile and computer operating systems. Memory 116 can also store user data in the information database 142. Information database may store user data such as the user's name, age, test results, interactive tutorial results, and any other information related to the user.

In one embodiment, the user data may be collected and organized into any desired output. For example, the data may be compiled into a plurality of different charts, graphs, and percentages to determine how the user is progressing. In another embodiment, the data for a plurality of users may be collected and organized into any desired output. For example, the data may be compiled into a plurality of different charts, graphs, and percentages to determine how a group is progressing, how one user is progressing compared to similar-level users, and the like.

Interactive tutorial 100 may have a character manager 120. The user can personalize the interactive tutorials by generating virtual characters that mimic actual people in the user's life. This allows the interactive tutorials to further replicate real-life situations. Character manager 120 may be configured to manage virtual characters used in the interactive tutorial. In one embodiment, the virtual character is a predetermined character stored in the characteristic database 122. In another embodiment, a user may select characteristics to generate the virtual character, as further discussed below and with reference to FIGS. 2A-2F.

The character manager 120 may have a characteristic database 122 to store a plurality of characteristics for different virtual characters. The virtual character may be a fictional or non-fictional character. For example, the virtual character may be a human, as further discussed with reference to FIGS. 2A-2F. In another example, the virtual character may be an animal, such as a pig or cat. In yet another example, the virtual character may be mystical, such as Pegasus or a unicorn. In still another example, the virtual character may be a non-living object, such as a tree. If the virtual character is non-fictional, such as a cat, the characteristics database 122 may store a plurality of predetermined characteristics associated with the cat that the user may select from to render the virtual character. For example, the characteristics associated with the cat may be short or long hair, the color of fur, the color of eyes, long or short ears, long or short tail, and other characteristics of a cat that the user desires to select. Once selection of the characteristics of the virtual character is received, the profile of the virtual character with the selected characteristics may be stored in the profile database 124.

In one embodiment, the user may upload a picture of the virtual character. The uploaded picture may then be used to render the virtual character. The picture may be any picture or image, such as from an actual character or even a drawing. This allows the user to personalize the virtual character to something or someone the user is familiar with.

FIGS. 2A-2F illustrate example embodiments of virtual character tables. As stated above, the virtual characters may be human characters. Referring to FIGS. 2A and 2B, the virtual characters may be parents 202, 204 of the user. Although illustrated with two parents 202, 204, this is not intended to be limiting as any number of parents may be used. FIG. 2A illustrates that an image or photo 206 of parent #1 202 was uploaded. Additionally, the plurality of characteristics 208 associated with a human may be selected for parent #1 202. Although illustrated with specific characteristics 208, this is not intended to be limiting because any type or variety of characteristics may be used to render the virtual character. As illustrated, the user may select a body type (i.e. slender, stocky, thin, muscular, and the like), clothes (i.e. shirt, dress, shorts, jeans, and color for each type of clothing), shoes (i.e. sneakers, flip flops, high heels, boots, and color for each type of shoes), language spoken by the virtual character (i.e. Spanish, Chinese, Hindu, and the like), and the mood of the character (i.e. silly, happy, funny, serious, nervous, scared, and the like). Once the characteristic selections 208 are completed, the table or profile may be saved in the profile database 124.

Virtual parent #2 204, as illustrated in FIG. 2B, does not have a photo 206 uploaded. Thus, the user may select additional characteristics 208 such as gender (i.e. Male or Female), hair type (i.e. short, long, curly, straight, mohawk, and the like), hair color, skin color (i.e. tan, fair, yellow, while, black, green, and the like), facial hair (i.e. goatee, beard, handlebar, and the like), and eye color. Once the characteristic selections 208 are completed, the table or profile may be saved in the profile database 124.

In another embodiment as illustrated in FIG. 2C, another virtual character that may be created is a doctor or counselor 210. The counselor 210 may be any type of counselor such as a medical doctor, speech pathologist, nurse, school counselor, principal, attorney, psychologist, or any other counselor. The counselor 210 may be used in the interactive tutorial to assist and/or be a part of the learning experience to help the user learn the concept(s) taught in the interactive tutorial, as will be further discussed below. A plurality of characteristics 208 associated with the counselor 210 may be selected. Once the characteristics 208 are selected, the table or profile may be saved in the profile database 124.

In still another embodiment, the user may also create a virtual character of himself 212. Similar to the tables above in FIGS. 2A-2C, the user may upload a picture or image 206 of himself 212. A plurality of characteristics 208 may also be selected. Once the characteristics 208 are selected, the table or profile may be saved in the profile database 124.

In yet another embodiment as illustrated in FIGS. 2E and 2F, the user may create virtual friends 214a, 214b. Similar to the tables above in FIGS. 2A-2D, the user may upload a picture or image 206 of the friends 214a, 214b and select at least one characteristic 208 for friends 214a, 214b. Once the characteristics 208 are selected, the table or profile may be saved in the profile database 124.

Figure 2G:
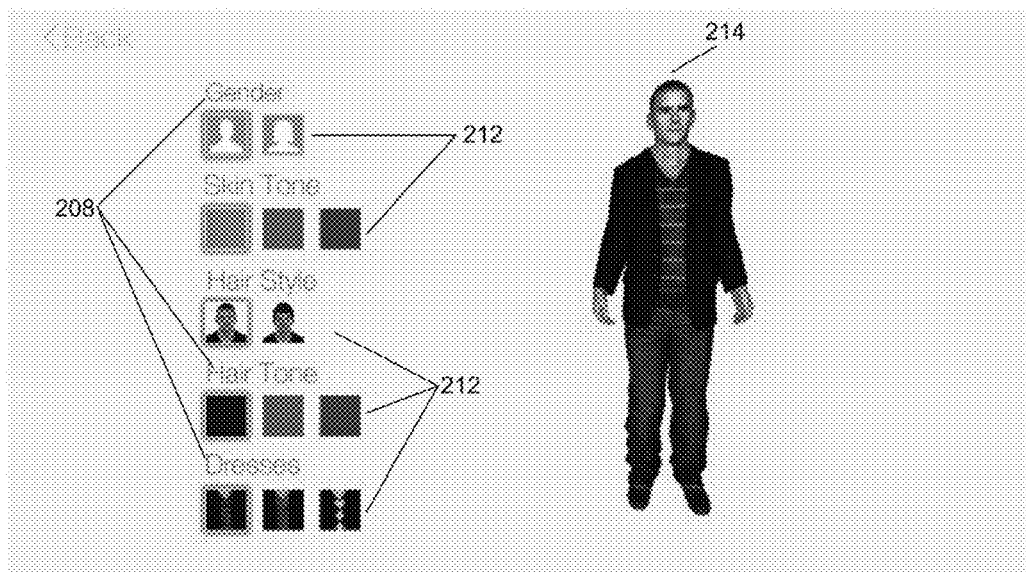

As is known in the art, the characteristics 208 may be selected via any known selection methods. For example, drop-down menus listing each option that may be selected may be presented on display 206. In another example, as illustrated in FIG. 2G, if the user is unable to read, the characteristics and options 208 may be selected from a visual presentation 212 of the characteristics 208, such as a visual presentation 212 of all the available genders, skin tone, hair style and tone, dress, and the like. Once the characteristic selections 208 are completed, the table or profile of the virtual character 214 may be saved in the profile database 124.

Referring back to FIG. 1A, interactive tutorial 100 may have an environment manager 126. Environment manager 126 may manage environments or settings associated with the interactive tutorial. Each environment may be associated with an interactive video to allow the interactive tutorial to further replicate real-life situations. For example, the interactive tutorial may teach hair brushing skills. Thus, the environment associated with the interactive tutorial to learn that skill may be the bathroom, bedroom, or at a vanity. In one embodiment, the user may select a generic, preloaded environment stored in the environment database 128 to use in the interactive tutorial. For example, the interactive tutorial may show the user's virtual character sitting in front of a vanity to learn hair brushing skills.

In another embodiment, the environment manager 126 may allow the user to personalize the environment of the interactive tutorial. The user can personalize the interactive tutorial by using environments that mimic actual places in the user's life. Each environment may be associated with an interactive video to allow the interactive tutorial to further replicate real-life situations. The user may upload a picture of the environment to the environment manager 126 and stored in the environment database 128. The picture may be a single snap shot, a panoramic view, video, or any other image of the environment. In one example, the user may upload a panoramic view of his bedroom to use as the setting in the interactive tutorial to teach hair brushing skills.

Figure 3:
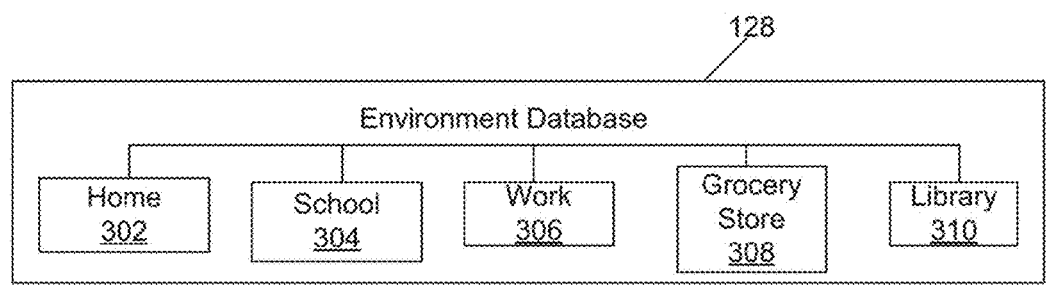
FIG. 3 illustrates an embodiment of example environments.

Referring now to FIG. 3, an illustration of example environments. Environment database 128 may store any type of environment such as a home 302, school 304, place of employment or work 306, any type of business such as a grocery store 308, library 310, and the like. Although illustrated with a few exemplary environments, this is not intended to be limiting as any type of environment may be used such as a gym, therapist office, telephone company, coffee shop, and the like.

Figures 4A, 4B, 4C:
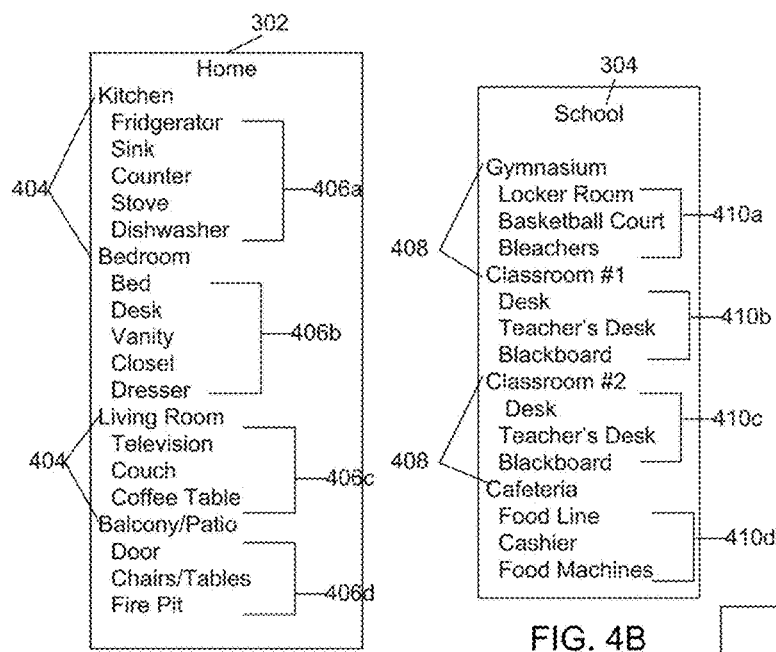
FIGS. 4A-4E illustrate example tables for each of the example environments of FIG. 3.
Figures 4D, 4E:
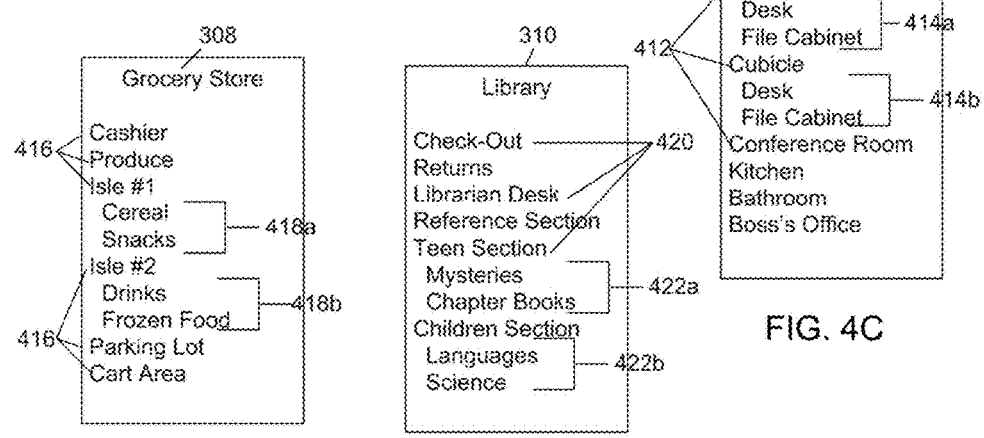

FIGS. 4A-4E illustrate example tables for each of the example environments of FIG. 3. Each environment may have associated sub-environments, such as in a hierarchical structure. FIG. 4A illustrates various sub-environments 404 in the home 302. Sub-environments may be places within or around the home 302 such as a kitchen, bathroom, living room, balcony/patio, and any other places around the home (i.e. front yard, back yard, stairs, and the like). Still further, each sub-environment 404 may have additional associated features 406a-d. For example, the associated features 406a-d in the kitchen may be the refrigerator, sink, counter, or stove. In other words, if the interactive tutorial is to learn how to chop vegetables, the skill may be learned on the counter in the kitchen. Thus, the counter may be displayed in the interactive tutorial. In another example, the skill to be learned may be how to wash dishes. Thus, a sink, full of dishes, may be displayed in the interactive tutorial to teach how to wash dishes.

FIG. 4B illustrates example sub-environments 408 associated with a school 304. Example sub-environments 408 may be the gymnasium, classrooms, cafeteria, and playground. Each sub-environment may also have associated features 410a-d. For example, the gymnasium may have features 410a-d of a locker room (i.e. male or female locker room), basketball court, tennis court, bleachers, and the like. In another example, the classroom may have associated features 410a-d such as a student desk, teacher's desk, blackboard, and the like. In use, in one example, the interactive tutorial may teach how to perfect a three-point shot. Therefore, the environment associated with the interactive tutorial may be the basketball court in the gymnasium of the school 304.

FIG. 4C illustrates sub-environments 412 associated with a place of employment or work 306. Each sub-environment 412 may also have associated features 414a-b. The skill to be learned in the interactive tutorial may dictate the type of environment to be displayed. For example, the tutorial may teach how to talk to a boss about getting a raise in salary. Therefore, the associated sub-environment 412 at work 306 may be the boss's office. FIG. 6D illustrates exemplary sub-environments 416 and features 418a-b in a grocery store 308 and FIG. 6E illustrates exemplary sub-environments 420 and features 422a-b in a library 310.

Referring back to FIG. 1A, the interactive tutorial 100 may have a video or tutorial manager 130. Video or tutorial manager 130 may manage the videos or tutorials used in the interactive tutorial. Each of the videos or tutorials may have the virtual characters and environments instantiated into the videos. In one embodiment, the interactive tutorial may first teach the user how to perform the skill being taught by initially presenting a teaching video or teaching tutorial showing the user how to properly carry out or complete the skill. The teaching video presents the skill to be learned without user interaction to illustrate how to properly carry out or complete the skill. In other words, the teaching video is an educational video presentation shown to the user without any user interaction to illustrate how to complete the skill. In one embodiment, the teaching video may have the virtual characters and associated environment instantiated into the teaching video.

Figure 5:
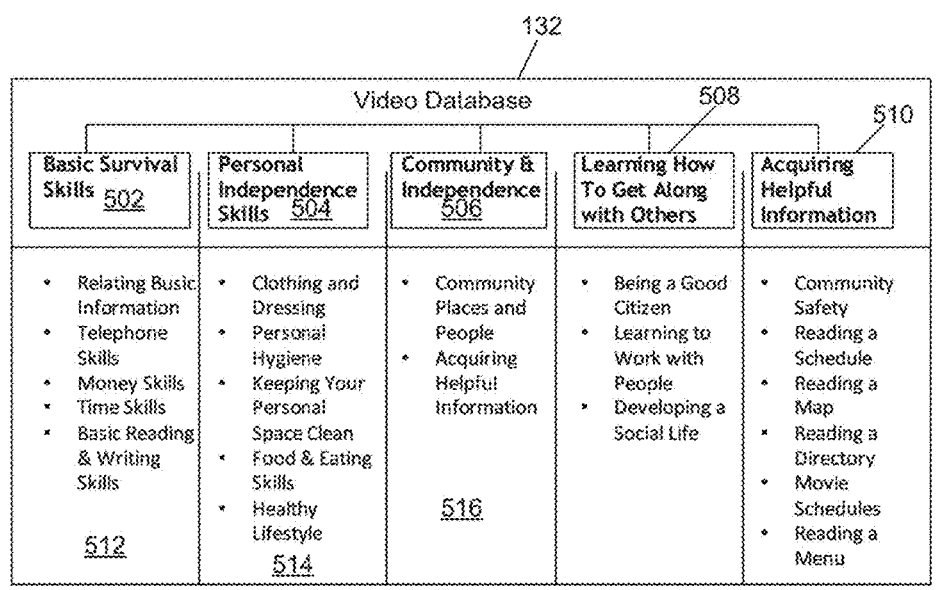
FIG. 5 illustrates an embodiment of exemplary videos.

In one embodiment, the environments from environment manager 126 and virtual characters from character manager 120 may be incorporated or instantiated into the video to replicate real-life situations in the interactive tutorials. The videos or tutorials may be stored in the video database 132, as illustrated in FIG. 5. The videos or tutorials may relate to any topic or skill and may have the virtual characters and environments instantiated into the videos. For example, the videos or tutorials may relate to basic survival skills 502, personal independence skills 504, community and independence 506, learning how to get along with others 508, acquiring helpful information 510, or any other desired skills. Although illustrated with several types of skills, this is not intended to be limiting as the interactive tutorial may be used to teach skills in many other fields, such as sport, languages, job skills, education (i.e. reading, writing, math, science, and the like), speech, and the like. Each of the skills may require the user to utilize multiple senses such as visual, auditory, and tactile, kinesthetic, and proprioceptive senses to learn and/or improve upon the skills taught in the interactive tutorial. In one embodiment, the interactive tutorial may incorporate the principals of speech and language pathology, including, but not limited to semantics, syntax, morphology, pragmatics, articulation, fluency, and cognition.

The video or tutorial database 132 may be organized in a hierarchical manner. Under each general topic, skills may be further defined. For example, under basic survival skills 502, the user can select to learn various specific or defined skills 512 such as how to properly talk on the telephone, basic money skills, or how to tell time. In another example, under personal independence skills 504, the user can learn various specific or defined skills 514 such as how to dress properly, maintain personal hygiene, or how to live a healthy lifestyle. In still another example, under community and independence 506, the user can learn various specific or defined skills 516 such as how to acquire community information (i.e. important community phone numbers such as police, fire station, hospital, and the like) or learn about the various neighborhood community organizations. Each skill to be learned (or re-learned) may be even further defined or broken down into micro-steps or basic steps so that the user may fully learn how to perform the skill, as further explained in Examples 1 and 2 below.

FIGS. 6A-6D illustrate exemplary skills taught in the interactive tutorials. FIG. 6A illustrates various exemplary skills the user can learn if wanting to learn basic survival skills 502. If the user would like to learn basics survival skills 502, the user may select to learn various skills such as how to provide address and phone number, how to greet a person, how to greet a person on the telephone, what to say when leaving an event, how to end a telephone conversation, how to count money, and other survival skills. FIG. 6B illustrates various exemplary skills the user can learn if wanting to learn community skills 504, such as the different people in the community, how to get to the grocery store, recreation center, or pool, how to contact the doctor, and other community skills.

FIG. 6C illustrates various exemplary skills the user can learn if wanting to learn personal independence skills 506. Under personal independence skills 506, the user may learn how to dress oneself, how to brush hair or teeth, how to prepare breakfast or lunch, and other independent skills. FIG. 6D illustrates various exemplary skills for learning how to get along with others 508. If the user would like to learn skills on how to get along with others 508, the user may learn how to greet friends or teachers, how to introduce himself, how to respond to various emotional situations, and other social skills.

Referring back to FIG. 1A, the interactive tutorial 100 may also have a prompt manager 134. When the user selects a skill to learn, prompting manager 134 may manage the cues, hints, or prompts used to guide or prompt a user through the interactive tutorial. Prompt manager 134 determines the level of hints, cues or prompting necessary to challenge and maximize the benefits of the interactive tutorial for the user. The level of prompting used may, in one embodiment, be based on user data stored in the information database 142 in order to maximize the experience of the interactive tutorial. The user data may be scores from a pre-test or post-test, data inputted by the user, counselor, parent, or any other authorized person, or prior tutorial data obtained from prior use of the interactive tutorial. In one embodiment, the user may be required to take a pre-test prior to starting the interactive tutorial and/or a post-test after completion of the interactive tutorial. The pre-test may be a test based on the skill to be learned. The resulting score may be used to determine how much knowledge the user has about the skill. The user may also be require to take a post-test at the end of the interactive tutorial to determine how much knowledge the user obtained after using the interactive tutorial. The post-test score may be used to determine the level of prompting for subsequent interactive tutorials. For example, if the user would like to learn how to brush his teeth, the pre-test may determine whether the user knows what a toothbrush and toothpaste are and their functions. The post-test may determine whether the user learned the skills and knows how to brush his teeth after completion of the interactive tutorial.

In another embodiment, an authorized person, such as the user's doctor, parent, counselor, or even the user himself may input data about the user's skill set or knowledge. In still another embodiment, the user data may be automatically determined or updated by the interactive tutorial 100 and saved in the information database 142. The user data may be automatically determined or updated by the interactive tutorial 100 via processor 102 based on the user user's current or prior use of the interactive tutorial. For example, if the user successfully completes an interactive tutorial on how to brush his teeth, the user's data may be updated to reflect whether the tutorial was completed successfully or unsuccessfully, level of prompting, time of input or responses, how much of the tutorial was completed, what steps the user was able to successfully complete, and other desired data. Prompt manager 130 may analyze and determine the strengths and weaknesses of the user to adapt the interactive tutorial to the user's ability level. Based on the analysis and determination of the user's ability level by prompt manager 130, the appropriate prompting and cueing may be incorporated into the interactive tutorial to challenge the user which results in a higher level of thinking for the user.

Based on the user's data, prompt manager 134 may determine the level of prompting necessary to begin the interactive tutorial to challenge the user. The level of prompting necessary to begin the interactive tutorial to challenge the user may be, for example, based on a determined overall score for the user based on the user's data and/or knowledge of the skill sets required to complete the interactive tutorial. For example, prompt manager 134 may determine that a low score range, for example between about 0%-30% may require maximum prompting. Thus, prompts stored in the maximum prompt database 136 may be used in the interactive tutorial. Although illustrated with a score range of between about 0%-30%, this is not intended to be limiting as any score range may be used. For example, a score range of between about 0%-50% may also require maximum prompting. In another embodiment, the level of prompting necessary to begin the interactive tutorial may be based on the level pre-set by an authorized person and/or the level automatically set by interactive tutorial 100 based on the user's current or prior use of the interactive tutorial.

In another example, prompt manager 134 may determine that a high score range, for example between about 70%-100%, may require minimum prompting. Thus, prompts stored in the minimum prompt database 140 may be used in the interactive tutorial. Although illustrated with a score range of between about 70%-100%, this is not intended to be limiting as any score range may be used. For example, a score range of between about 50%-100% may also require minimum prompting. In another embodiment, the level of prompting necessary to begin the interactive tutorial may be based on the level pre-selected by an authorized person and/or the level automatically selected or set by interactive tutorial 100 based on current or prior use of the interactive tutorial.

In yet another example, prompt manager 134 may determine that a mid-score range, for example between about 30%-70%, may require moderate prompting. Thus, prompts stored in the moderate prompt database 138 may be used in the interactive tutorial. Although illustrated with a score range of between about 70%-100%, this is not intended to be limiting as any score range may be used. For example, a score range of between about 20%-80% may also require moderate prompting. In another embodiment, the level of prompting necessary to begin the interactive tutorial may be based on the level pre-selected by an authorized person and/or the level automatically set or selected by interactive tutorial 100 based on the user's current or prior use of the interactive tutorial.

In still another embodiment, the interactive tutorial 100 may begin all interactive tutorials at a minimum prompt level. Then, based on the user's responses or input and/or the number of instruction repeats, the interactive tutorial 100 may automatically determine whether an escalation or de-escalation of prompts is necessary, as further explained in detail below.

When minimal prompting is utilized in the interactive tutorial, minimum prompt instructions stored in the minimum prompt database 140 may be used in the interactive tutorial. For example, when the user is instructed to put toothpaste on the toothbrush, the interactive tutorial may audibly instruct the user to "Put toothpaste on the toothbrush". The system may then wait for a predetermined period of time to receive an input from the user. For example, the camera may detect movement or gestures by the user or the microphone may detect an audio response from the user. In another example, system may detect movement by the user via motion-sensor devices attached to the user's body. In still another example, the user may select the toothpaste and toothbrush using a display, such as a touch screen display, or an input device, such as a mouse.

If no input is received, such as from input devices 104, sensor devices 114, microphone 112, or camera 110 after a predetermined period of time, the instructions may be repeated. In one embodiment, the instructions may be a repeat of the exact or similar instructions that was previously presented. In another embodiment, the instructions may be reworded differently as new instructions. For example, the repeated instructions may be: "Put the toothpaste in one hand and the toothbrush in the other hand."

In one embodiment, the predetermined period of time may be between about 2 seconds to 2 minutes. In another embodiment, the predetermined period of time may be between about 1 second to 5 minutes. In yet another embodiment, the predetermined period of time may be between about 0.5 seconds to 10 minutes.

If no input is received after the predetermined period of time and after a predetermined number of times the instructions were repeated, prompt manager 134 may escalate the prompting to the next level, moderate prompting stored in the moderate prompt database 138, to assist the user in completing the interactive tutorial. Moderate prompting may include additional hints, cues, prompts, answers, and/or remodeling of the skill for the user. In another embodiment, moderate prompting may include a virtual assistant, such as a parent, counselor, or friend, to assist the user in the interactive tutorial. For example, in a moderate prompt, the virtual assistant may physically show the virtual user what the toothpaste and toothbrush are. This may be achieved by any known means. Such as, in one example, when the audible instruction says: "Put toothpaste", the image of the toothpaste may be highlighted, the image of the toothpaste may be brought forward, the outline of the toothpaste may be bolded and/or flashed, the entire toothpaste image may blink and/or flash, the color of the toothpaste may change, the background may gray out leaving only the toothpaste image visible, or any other similar methods to highlight the toothpaste to make it stand out. In one embodiment, a pop-up window with an image of the toothpaste may be used to further visually illustrate to the user what the toothpaste is. In yet another embodiment, a video may be presented to the user to illustrate the skill. The video may, in one example, be presented in a pop-up window. The video may, in another example, be presented in at least a portion of the display or on the entire display. In still another example, the virtual assistant may pick up the toothpaste.

Interactive tutorial 100 may then wait for a predetermined period of time to determine if the user selected the toothpaste. If no input is received, such as from input devices 104, sensor devices 114, microphone 112, or camera 110 after a predetermined period of time, the instructions may be repeated. In one embodiment, the instructions may be a repeat of the exact or similar instructions that was previously presented. In another embodiment, the instructions may be reworded differently as new instructions. For example, the repeated instructions may be: "Put the toothpaste in one hand."

In one embodiment, the predetermined period of time may be between about 2 seconds to 2 minutes. In another embodiment, the predetermined period of time may be between about 1 second to 5 minutes. In yet another embodiment, the predetermined period of time may be between about 0.5 seconds to 10 minutes.

If interactive tutorial 100 determines that the user selected the proper product, namely the toothpaste, the interactive tutorial 100 may then complete the instructions: "on the toothbrush". The image of the toothbrush may be highlighted, the image of the toothbrush may be brought forward, the outline of the toothbrush may be bolded and/or flashed, the entire toothbrush image may blink and/or flash, the color of the toothbrush may change, the background may gray out leaving only the toothbrush image visible, or any other similar methods to highlight the toothbrush to stand out. In one embodiment, a pop-up window with an image of the toothbrush may be used to further visually illustrate to the user what the toothbrush is. In yet another embodiment, a video may be presented to the user to illustrate the skill. The video may, in one example, be presented in a pop-up window. The video may, in another example, be presented in at least a portion of the display or on the entire display.

Interactive tutorial 100 may then wait for a predetermined period of time to determine if the user selected the toothbrush. If no input is received, such as from input devices 104, sensor devices 114, microphone 112, or camera 110 after a predetermined period of time, the instructions may be repeated. In one embodiment, the instructions may be a repeat of the exact or similar instructions that was previously presented. In another embodiment, the instructions may be reworded differently as new instructions. For example, the repeated instructions may be: "Put the toothbrush in the other hand."

In one embodiment, the predetermined period of time may be between about 2 seconds to 2 minutes. In another embodiment, the predetermined period of time may be between about 1 second to 5 minutes. In yet another embodiment, the predetermined period of time may be between about 0.5 seconds to 10 minutes.

If no input is received after the predetermined period of time and after a predetermined number of times the instruction was repeated, prompt manager 134 may escalate to the next prompting level, maximum prompting stored in the maximum prompt database 138, to assist the user in completing the interactive tutorial. Maximum prompting may include use of another virtual character, such as a personal assistant, to assist the user in completing the interactive tutorial. In one embodiment, the virtual assistant may be the user's doctor or counselor. In another embodiment, the virtual assistant may be the user's parent or friend. Any virtual assistant may be used to assist the user when maximum prompting is escalated.

When the prompting is escalated to maximum prompting, the user may interact with the virtual assistant to ask questions and/or ask for assistance. Virtual assistant may respond to the user, model the skill to be learned to teach or re-teach the user how to complete the skill, or physically assist the virtual user how to complete the skill. By modeling the skill to be learned, the user may learn through mimicking the actions of the virtual assistant. In one example, if the user does not remember how to complete a task, the user may respond "I forgot". The virtual assistant may respond with an associated and appropriate response such as "Ok, I will show you how to do it again." In another example, the user may respond "Please show me the skill again." The virtual assistant may also respond with an associated and appropriate response.

In still another example, the virtual assistant may take one of the virtual user's hand to grab the toothpaste and say, "Put toothpaste". In one embodiment, a pop-up picture or video of the specific action or skill may also be presented to closer illustrate how to perform the skill or task. In this example, the picture of video may show a pop-up window illustrating a closer view of the virtual assistant holding the virtual user's hand to grasp the toothpaste. Maximum prompting may show, teach, or re-teach the user what a toothpaste is.

The virtual assistant may then take the other virtual user's hand to grab the toothbrush and say, "on the toothbrush". In one embodiment, a pop-up picture or video of the specific action or skill may also be presented with a closer view or illustration of how to perform the skill or task. In this example, the video may show the virtual assistant holding the virtual user's hand to grasp the toothbrush. This will show, teach, or re-teach the user what a toothbrush is. The instructions may be spoken by the virtual assistant to coach the virtual user through the steps. In another embodiment, the instructions may be presented by a third party, such as the computing device or another virtual character.

Although the virtual assistant is described as being used with moderate and maximum prompting, this is not intended to be limiting as the virtual assistant may be used at any time throughout use of the interactive tutorial. In one embodiment, at any time during the interactive tutorial, the user may request the virtual assistant. For example, the user may say: "Miss Rubalcaba, can you please help me" and the virtual assistant (having an appearance similar to Miss Rubalcaba) may appear to assist the user. In another example, the user may say: "I need you to show me how to do that again, Mr. Mina" and the virtual assistant (having an appearance similar to Mr. Mina) may appear and show the user how to complete the task.

Referring now to FIG. 1B, an example embodiment of an interactive tutorial with integrated escalating prompt system. The system 170 may have a plurality of computing devices 162a-n. The computing devices 162a-n may be any known portable or non-portable computing device able to present the interactive tutorial such as a mobile telephone, desktop computers, wearable computing devices, projectors, tablet, netbook, interactive television, laptop, gaming devices (i.e. Kinect™, Playstation™, Xbox™, and the like), and the like.

Each of the computing devices 162a-n may be configured to communicate with an interactive tutorial server 152 via network 150. Interactive tutorial server 152 may have a character manager 160 similar to character manager 120 described above in FIG. 1A, an environment manager 158 similar to environment manager 126 described above in FIG. 1A, prompt manager 156 similar to prompt manager 130 described above in FIG. 1A, and a video or tutorial manager 154 similar to video manager 130 described above in FIG. 1A. For brevity, the functions of each of the character manager 160, environment manager 158, prompt manager 156, and video or tutorial manager 154 will not be repeated.

Through the use of escalated prompts, multiple senses such as visual, auditory, and tactile, kinesthetic, and proprioceptive senses, and personalization of the interactive tutorial, the user may eventually independently perform the skills presented in the interactive tutorial with minimal to no prompting. The interactive tutorial may automatically adjust the skill level and/or the skills to be learned based on the user's performance, amount of time necessary to perform the skills, amount of prompting required, and/or the number of times the instructions are repeated. Through the use of different senses and integrated escalating prompts, the user is require to use a higher level of thinking to complete the interactive tutorial.

Figure 7:
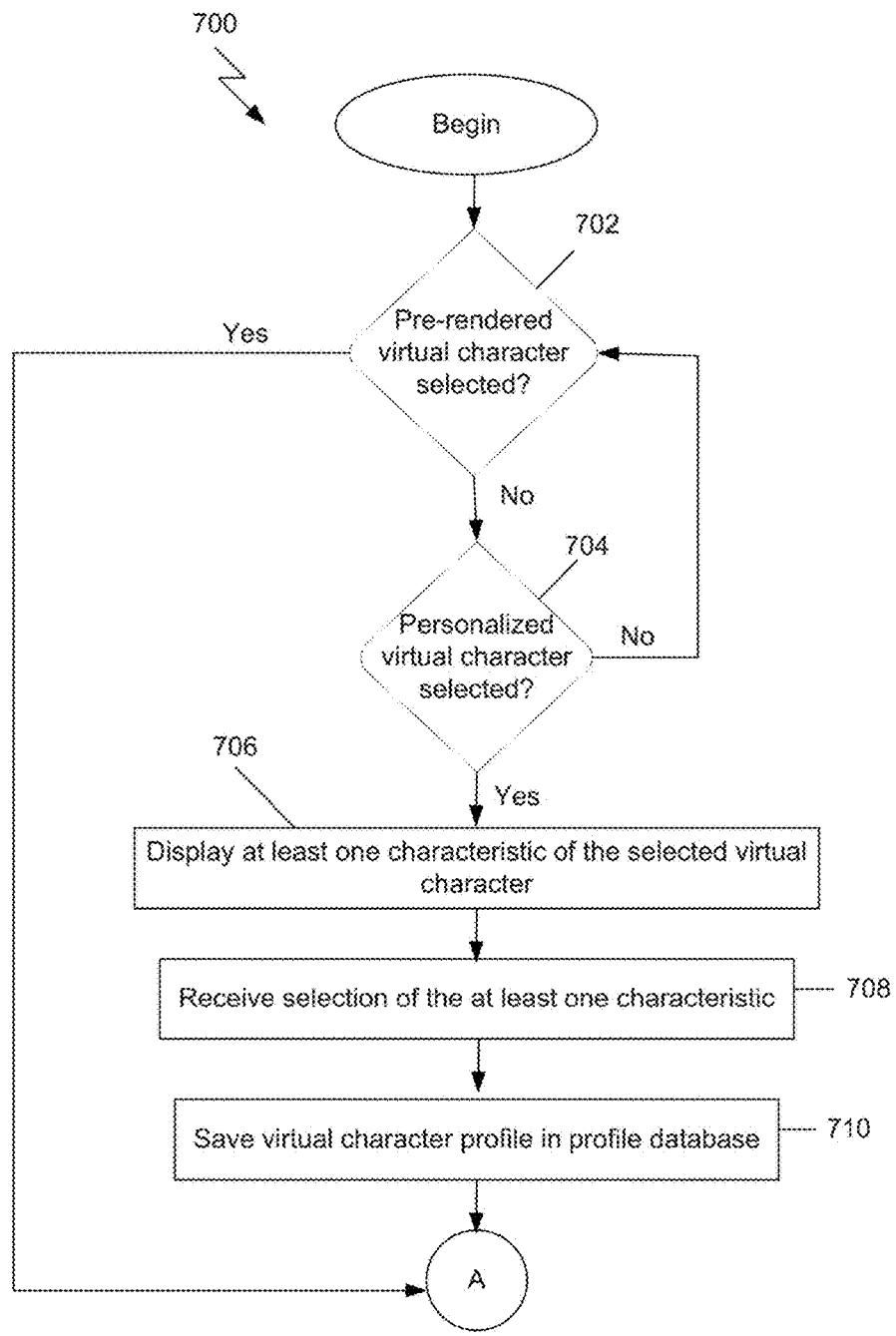
FIG. 7 illustrates a flow chart of an exemplary method of personalizing a virtual character used in the interactive tutorial.

FIG. 7 illustrates a flow chart of an exemplary method of personalizing a virtual character used in the interactive tutorial. The method 700 begins with determining whether a pre-rendered virtual character was selected at 702. If a pre-rendered virtual character was selected at 702, the flow chart may continue in FIG. 10. If a pre-rendered virtual character was not selected at 702, a determination of whether a virtual character is to be personalized is made at 704. If no selection is received at 704, the method may repeat at 702. The virtual character may be selected from and managed by a character manager, such as character manager 120, 160 illustrated in FIGS. 1A, 1B. The user can personalize the interactive tutorials by generating virtual characters that mimic actual people in the user's life. This allows the interactive tutorials to further replicate real-life situations.

If a selection is detected at 704, at least one characteristic of the selected virtual character may be displayed at 706. The user may select a plurality of characteristics to generate the virtual character. The plurality of characteristics may be stored in a database, such as characteristic database 122 illustrated in FIGS. 1A, 1B. The virtual character may be a fictional or non-fictional, non-living or living characters. For example, the virtual character may be a human. In another example, the virtual character may be an animal, such as a pig or cat. In yet another example, the virtual character may be mystical, such as Pegasus or a unicorn. In still another example, the virtual character may be a non-living object, such as a tree. If the virtual character is non-fictional, such as a cat, characteristics associated with the cat may be, for example, short or long hair, the color of fur, the color of eyes, long or short ears, long or short tail, and other characteristics of a cat that the user desires to select. Once selection of the characteristics of the virtual character is received, the profile of the virtual character with the selected characteristics may be stored, such as in profile database 124 illustrated in FIG. 1.

In another embodiment, the user may upload a picture to associate with the virtual character. The uploaded picture may then be used to generate a rendering of the virtual character. The picture may be any picture or image, such as from an actual character or even a drawing. This allows the user to personalize the virtual character to something or someone the user is familiar with.

The user may generate characters such as a parent, counselor, friends, and any other person(s). Exemplary characteristics may be body type (i.e. slender, stocky, thin, muscular, and the like), clothes (i.e. shirt, dress, shorts, jeans, and color for each type of clothing), shoes (i.e. sneakers, flip flops, high heels, boots, and color for each type of shoes), language spoken by the virtual character (i.e. Spanish, Chinese, Hindu, and the like), and the mood of the character (i.e. silly, happy, funny, serious, nervous, scared, and the like).

The user may also create a virtual character of himself. Similar to the characteristics described above, the user may upload a picture or image of himself and/or select characteristics from a plurality of associated characteristics.

As is known in the art, selection of the characteristics may be obtained via any known selection methods. For example, drop-down menus listing each option that may be selected may be presented on graphical user interface (GUI) on display. In another example, if the user is unable to read, the characteristics and options may be selected from a visual presentation of the characteristics, such as a visual presentation of all the available colors, hair type, skin tone, eye colors, and the like. Once the at least one characteristic is received at 708, the table or profile may be saved in a profile database at 710.

Figure 8:
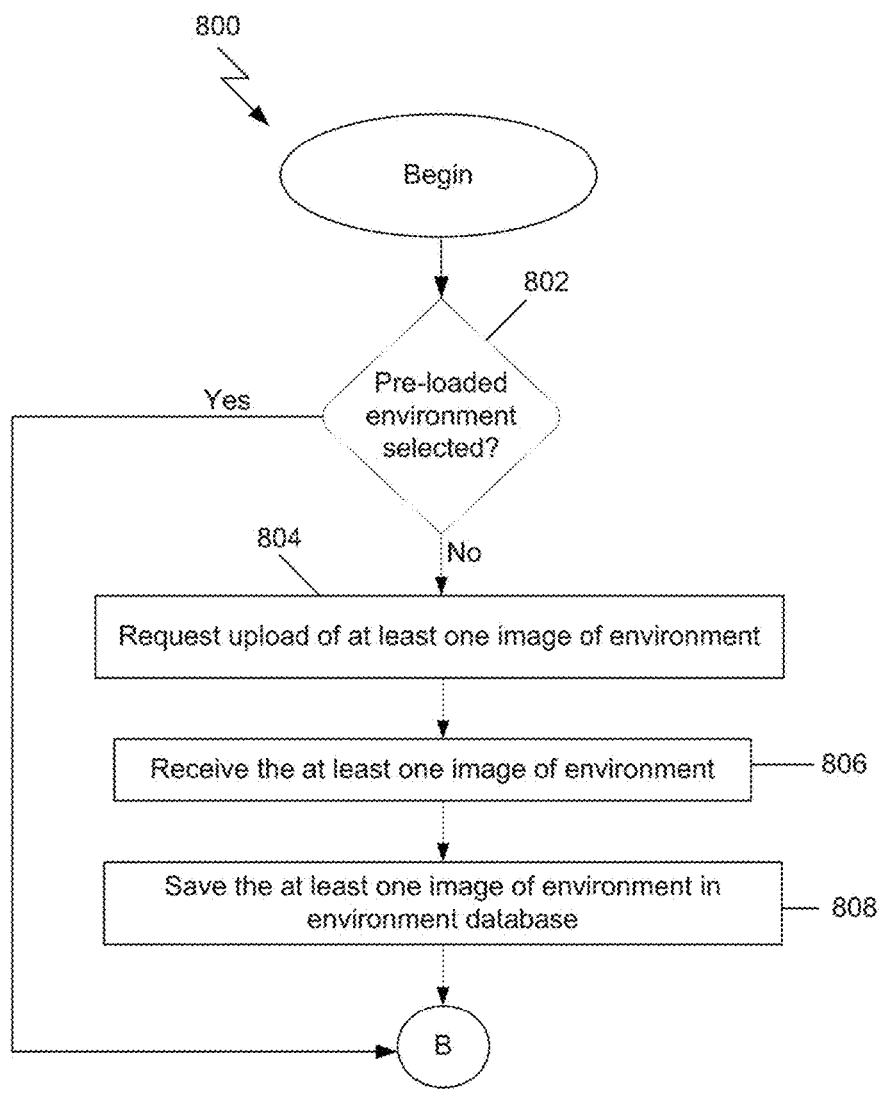
FIG. 8 illustrates a flow chart of an exemplary method of personalizing an environment in the interactive tutorial.

FIG. 8 illustrates a flow chart of an exemplary method of personalizing an environment in the interactive tutorial. The method 800 begins with a determination of whether a pre-loaded environment is selected at 802. The environments or settings used in the interactive tutorial may be managed by an environment manager, such as environment manager 126, 158 illustrated in FIGS. 1A, 1B. Each environment may be associated with an interactive video to allow the interactive tutorial to further replicate real-life situations. For example, the interactive tutorial may teach hair brushing skills. Thus, the environment associated with the interactive tutorial to learn that skill may take place in the bathroom, bedroom, or at a vanity. In one embodiment, the user may select a generic, preloaded environment stored in a database, such as environment database 128 illustrated in FIGS. 1A, 1B. For example, the interactive tutorial may show the user's virtual character sitting in front of a vanity to learn the skills of how to brush his hair.

Figure 10:
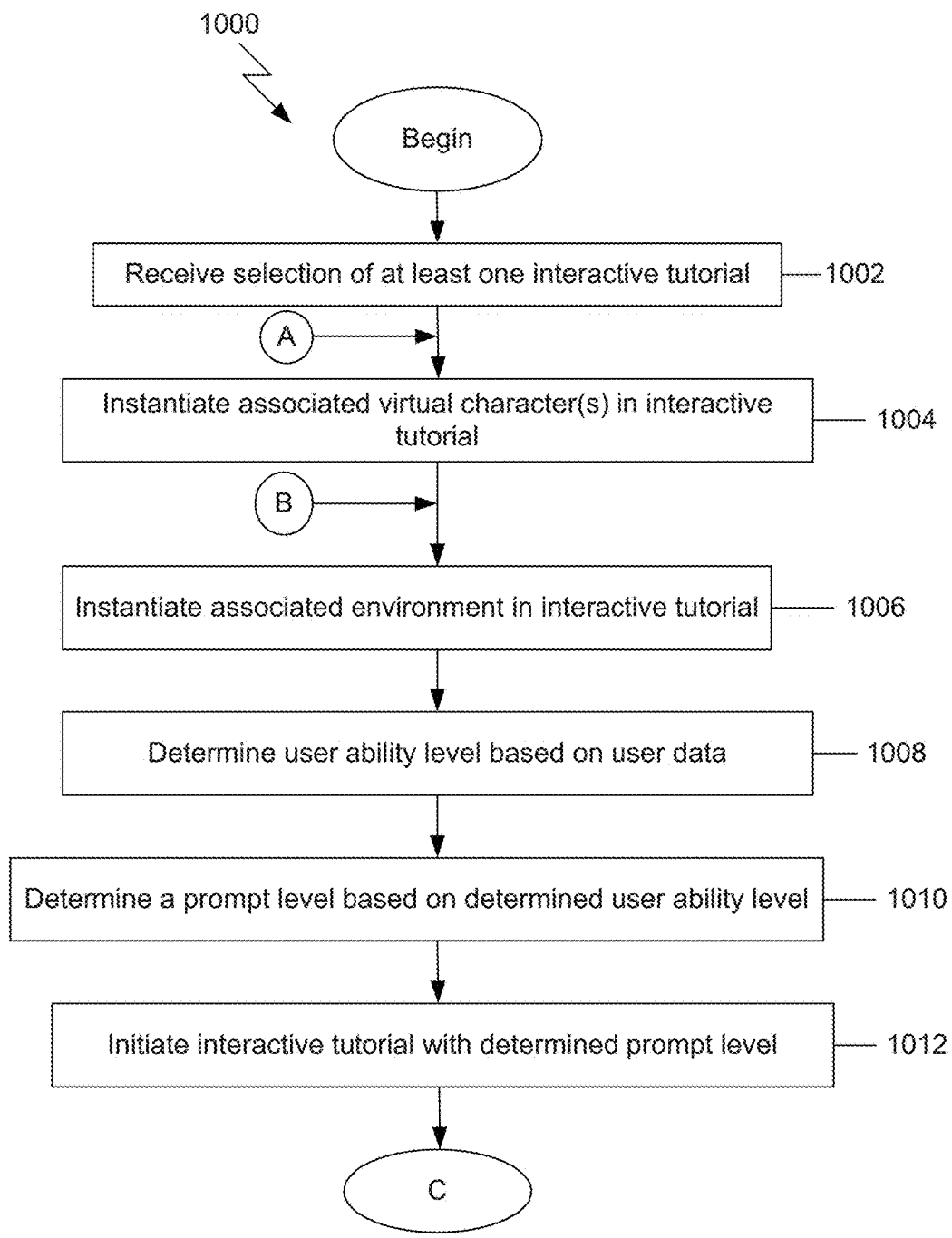
FIG. 10 illustrates a flow chart of an exemplary method of presenting an interactive tutorial with integrated escalating prompts.

If a selection is detected at 802, the method may continue in FIG. 10. If no selected of a pre-loaded environment is detected at 802, a request to upload at least one image of the environment is made at 804. The user can personalize the interactive tutorials by using environments that mimic actual places in the user's life. The user may upload a video or picture of the environment at 806. Once received, the video or picture may be stored in a database, such as environment database 128 illustrated in FIGS. 1A, 1B, at 810. The environment video or picture may be a single snap shot, video, a panoramic view, or any other image of the environment. In one example, the user may upload a panoramic view of his bedroom to use as the environment in the interactive tutorial to teach hair brushing skills.

Example environments may be a home, school, place of employment or work, any type of business such as a grocery store, library, and the like. Although illustrated with a few exemplary environments, this is not intended to be limiting as any type of environment may be used such as a gym, therapist office, telephone company, coffee shop, and the like.

Each environment may have associated sub-environments, such as in a hierarchical structure. For example, sub-environments at the home may be a kitchen, bathroom, living room, balcony/patio, and any other places around the home (i.e. front yard, back yard, stairs, and the like). Still further, each sub-environment may have additional associated features to further define the environment or setting. For example, the additional associated features within the kitchen may be the refrigerator, sink, counter, or stove. In other words, if the interactive tutorial is to learn how to chop vegetables, the skill may be learned on the counter in the kitchen. Thus, the counter may be displayed in the interactive tutorial. In another example, the skill to be learned may be how to wash dishes. Thus, a sink, full of dishes, may be displayed in the interactive tutorial to teach how to wash dishes.

Figure 9:
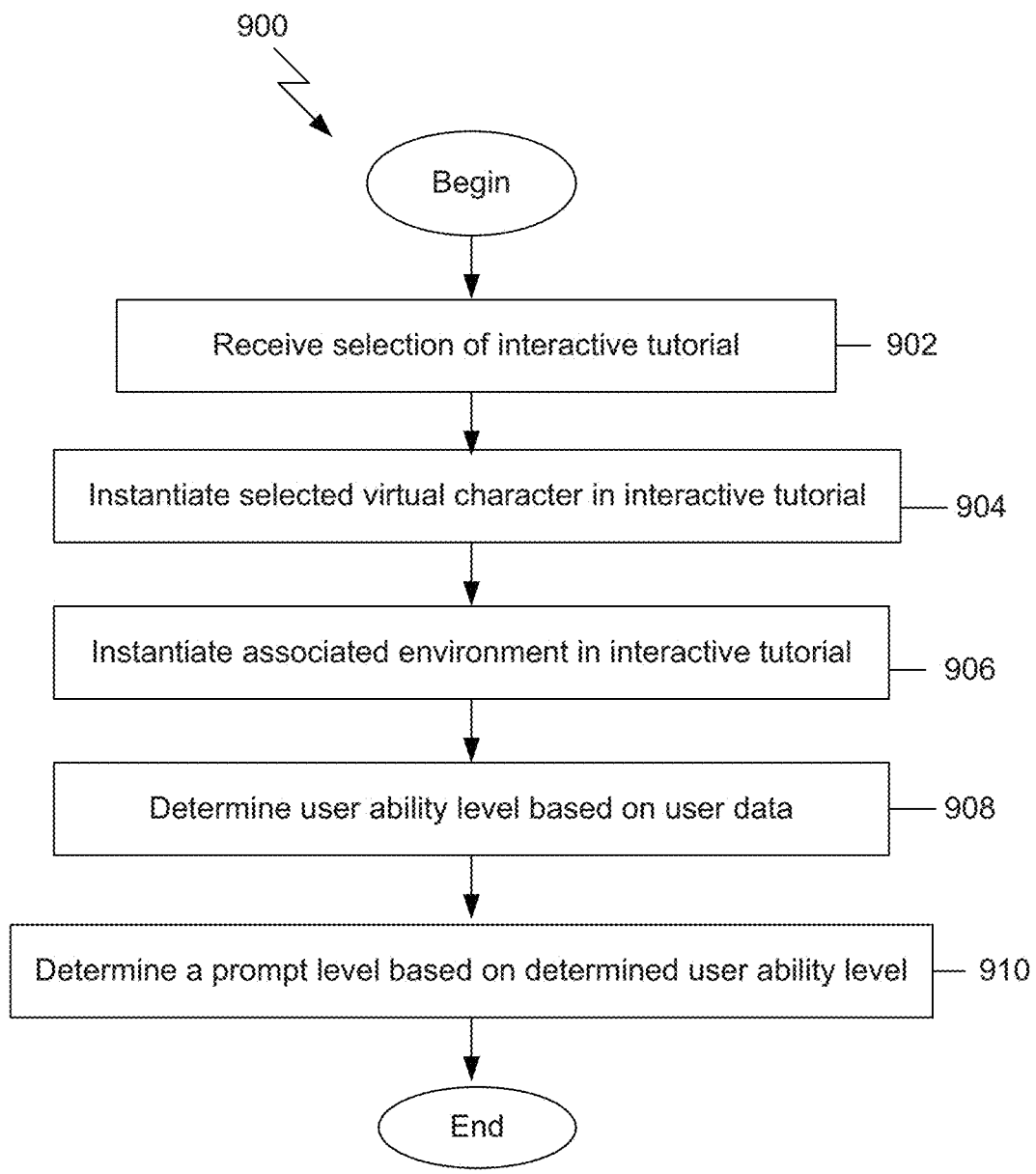
FIG. 9 illustrates a flow chart of an exemplary method of selecting an interactive tutorial.

FIG. 9 illustrates a flow chart of an exemplary method of selecting an interactive tutorial. A selection of an interactive tutorial may be received at 902. The videos or tutorial associated with the interactive tutorial may be managed by a manager, such as video manager 130, 154 illustrated in FIGS. 1A, 1B. The interactive tutorial may first present a teaching video or teaching tutorial to teach the user how to perform the skill being taught. The initial teaching video presents a video or tutorial showing the user how to properly carry out or complete the skill. The teaching video presents the skill to be learned without user interaction to illustrate how to properly carry out or complete the skill. In other words, the teaching video is an educational video presentation shown to the user without any user interaction to illustrate how to complete the skill. In one embodiment, the teaching video may have the virtual characters and associated environment instantiated into the teaching video.

The selected virtual characters may be instantiated in the interactive tutorial at 904. An environment associated with the interactive tutorial may also be instantiated into the interactive tutorial or video at 906. The selected characters and environment or setting may be personalized to replicate real-life situations in the interactive tutorials.

The videos or tutorials may relate to any topic or skill and may have the virtual characters and environments instantiated into the videos. For example, the videos or tutorials may relate to basic survival skills, personal independence skills, community and independence, learning how to get along with others, acquiring helpful information, or any other desired skills. Although illustrated with several types of skills, this is not intended to be limiting as the interactive tutorial may be used to teach skills in many other fields, such as sport, languages, job skills, education (i.e. reading, writing, math, science, and the like), speech, and the like. Each of the skills may require the user to utilize multiple senses such as visual, auditory, and tactile, kinesthetic, and proprioceptive senses to learn and/or improve upon the skills taught in the interactive tutorial. In one embodiment, the interactive tutorial may incorporate the principals of speech and language pathology, including, but not limited to semantics, syntax, morphology, pragmatics, articulation, fluency, and cognition.

The video or tutorial database may be organized in a hierarchical manner. Under each general topic, skills may be further defined and associated with the general topic. For example, under basic survival skills, the user can learn various specific or defined associated skills such as how to properly talk on the telephone, basic money skills, or how to tell time. In another example, under personal independence skills, the user can learn various specific or defined skills such as how to dress properly, maintain personal hygiene, or how to live a healthy lifestyle. In still another example, under community and independence, the user can learn various specific or defined associated skills such as how to acquire community information (i.e. important community phone numbers such as police, fire station, hospital, and the like) or learn about the various neighborhood community organizations.

Still further, the skills to be learned can be further defined to specific skills. For example, the user can learn basic survival skills which are further defined to teach the user how to provide address and phone number, how to greet a person, how to greet a person on the telephone, what to say when leaving an event, how to end a telephone conversation, how to count money, and other survival skills. In another example, if wanting to learn community skills, the skills can be further defined to teach the user about the different people in the community, how to get to the grocery store, recreation center, or pool, how to contact the doctor, and other community skills. In still another example, for personal independence skills, the user may learn further defined or specific skills such as how to put on a shirt or pants, how to brush hair or teeth, how to prepare breakfast or lunch, and other independence skills.

The method 900 may then determine the user's ability level based on user data at 908. The user's ability level is determined in order to maximize and challenge the user's experience during use of the interactive tutorial. User data may be stored in a memory, such as memory 116 illustrated in FIG. 1A. User data may be any information such as the user's name, age, test results, prompt level, reaction or response times, interactive tutorial results, and any other information related to the user. The user data may be scores from a pre-test or post-test, data inputted by the user, counselor, parent, or any other authorized person, or prior interactive tutorial data obtained from prior use of the interactive tutorial. In one embodiment, the user may be required to take a pre-test prior to starting the interactive tutorial and/or a post-test after completion of the interactive tutorial. The pre-test may be a test based on the skill to be learned. The resulting score may be used to determine how much knowledge the user has about the skill. The user may also be require to take a post-test at the end of the interactive tutorial to determine how much knowledge the user obtained after using the interactive tutorial. The post-test score may be used to determine the level of prompting to use in subsequent interactive tutorials. For example, if the user would like to learn how to brush his teeth, the pre-test may determine whether the user knows what a toothbrush and toothpaste are and their functions. The post-test may determine whether the user learned the skills and knows how to brush his teeth after completing the interactive tutorial.

In another embodiment, an authorized person, such as the user's doctor, parent, counselor, or even the user himself may input data about the user's skill set or knowledge. In still another embodiment, the user data may be automatically determined or updated by the interactive tutorial system. The user data may be automatically determined or updated by the interactive tutorial based on the user user's current or prior use of the interactive tutorial. For example, if the user successfully completes an interactive tutorial on how to brush his teeth, the user's data may be updated to reflect whether the tutorial was completed successfully or unsuccessfully, how much of the tutorial was completed, level of prompting, response times, what steps the user was able to successfully complete, and other desired data.

A prompt level based on the determined user ability level may be determined at 910. The determination of the prompt level may be made by a manager, such as prompt manager 130, 156 illustrated in FIGS. 1A, 1B. The determined prompt level may be based on a determined overall score for the user based on the user's data and/or knowledge of the skill set(s) required for the interactive tutorial. Based on the analysis and determination of the user's ability level, the appropriate prompting, hints, and cueing may be incorporated into the interactive tutorial to challenge the user.

For example, a low score range, for example between about 0%-30% may require maximum prompting. Although illustrated with a score range of between about 0%-30%, this is not intended to be limiting as any score range may be used. For example, a score range of between about 0%-50% may also require maximum prompting. In another embodiment, the level of prompting necessary to begin the interactive tutorial may be based on the prompt level pre-set by the authorized person and/or the prompt level may be automatically selected or set based on the user's current or prior use of the interactive tutorial.

In another example, a high score range, for example between about 70%-100%, may require minimum prompting. Although illustrated with a score range of between about 70%-100%, this is not intended to be limiting as any score range may be used. For example, a score range of between about 50%-100% may also require minimum prompting. In another embodiment, the level of prompting necessary to begin the interactive tutorial may be based on the prompt level pre-selected by the authorized person and/or the prompt level may be automatically selected or set based on current or prior use of the interactive tutorial.

In yet another example, a mid-score range, for example between about 30%-70%, may require moderate prompting. Although illustrated with a score range of between about 70%-100%, this is not intended to be limiting as any score range may be used. For example, a score range of between about 20%-80% may also require moderate prompting. In another embodiment, the level of prompting necessary to begin the interactive tutorial may be based on the prompt level pre-selected by the authorized person and/or the prompt level may be automatically set or selected based on the user's current or prior use of the interactive tutorial.

In still another embodiment, the interactive tutorial may begin all interactive tutorials at a minimum prompt level. Then, based on the user's responses or input and/or the number of instruction repeats, the interactive tutorial may automatically determine whether an escalation or de-escalation of prompts is necessary.

FIG. 10 illustrates a flow chart of an exemplary method of presenting an interactive tutorial with integrated escalating prompts. The method 1000 beings with receiving a selection of at least one interactive tutorial at 1002. Once the tutorial is selected at 1002, the associated virtual character(s) may be instantiated in the interactive tutorial at 1004. An associated environment may also be instantiated in the interactive tutorial at 1006. The user's ability level may then be determined based on user data at 1008. Based on the user's determined ability level, a prompt level to be used in the interactive tutorial may be determined at 1010. The selected interactive tutorial may then be initiated using the determined prompt level at 1012.

Figure 11:
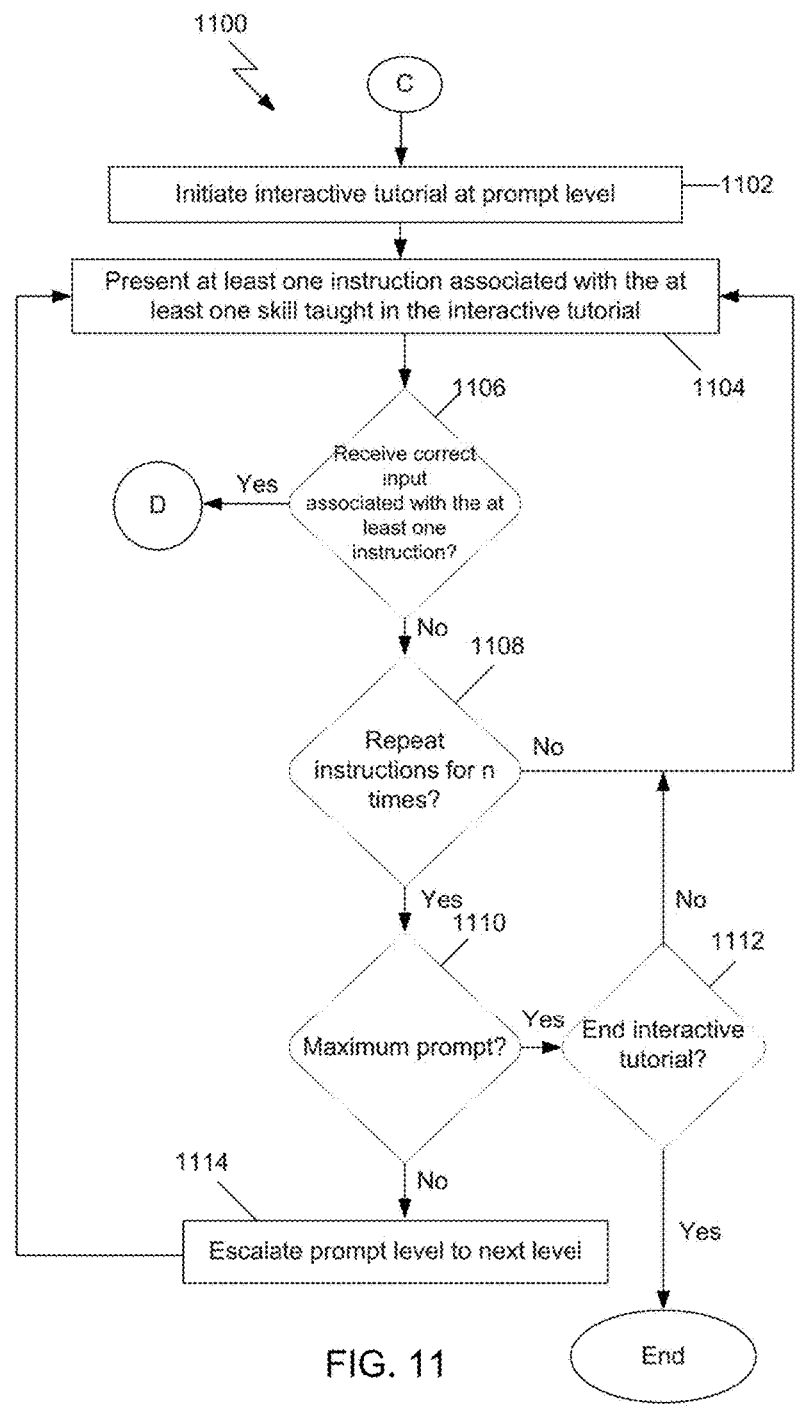
FIG. 11 illustrates a flow chart of an exemplary method of escalating prompts in the interactive tutorial.

FIG. 11 illustrates a flow chart of an exemplary method of escalating prompts in the interactive tutorial. The method 1100 may begin by initiating an interactive tutorial with a determined prompt level at 1102. The prompt level may be determined as described above with reference to FIG. 9. When initiating the interactive tutorial, a teaching video or teaching tutorial may be initially presented to first teach the user how to properly perform the skill(s) being taught. The teaching video or teaching tutorial may show the user how to properly carry out or complete the skill(s). The teaching video presents the skill to be learned without user interaction to illustrate how to properly carry out or complete the skill. In other words, the teaching video is an educational video presentation shown to the user without any user interaction to illustrate how to complete the skill. In one embodiment, the teaching video may have the virtual characters and associated environment instantiated into the teaching video.

At least one instruction associated with the at least one skill taught in the interactive tutorial may be presented at 1104. For example, when the user is instructed to put toothpaste on the toothbrush, the interactive tutorial may audibly instruct the user to "Put toothpaste on the toothbrush". A determination of whether an input associated with the at least instruction is received at 1106. If the input is received and is correct at 1106, the method 1100 may continue in FIG. 12. If no input is received, the system may wait for an input for a predetermined period of time. For example, the camera may detect movement by the user. In another example, movement by the user may be detected via motion-sensor devices attached to the user's body. In still another example, the user may select the toothpaste and toothbrush using a display, such as a touch screen display, or an input device, such as a mouse. In yet another example, the microphone may detect an audio response from the user.

In one embodiment, the predetermined period of time may be between about 2 seconds to 2 minutes. In another embodiment, the predetermined period of time may be between about 1 second to 5 minutes. In yet another embodiment, the predetermined period of time may be between about 0.5 seconds to 10 minutes.

If the input is incorrect and/or not received at 1106 within the predetermined period of time, the instructions may be repeated for "n" times (where "n" in an integer) at 1108. N may be any pre-determined or pre-set number of times the instructions may be repeated. For example, n may be three (3) times. If the instructions have not been repeated for n number of times at 1108, the method 1100 may repeat at 1104. In one embodiment, the instructions may be a repeat of the exact or similar instructions that was previously presented. In another embodiment, the instructions may be reworded differently as new instructions. For example, the repeated instructions may be: "Put the toothpaste in one hand and the toothbrush in the other hand."

If the instructions have been repeated for n number of times at 1108, a determination is made whether the maximum level of prompting is achieved at 1110. If the maximum prompting is not achieved at 1110, the prompt level may be escalated to the next level at 1114. For example, if minimal prompting was used, the prompt level may automatically be escalated to moderate prompting. If moderate prompting was used, the prompt level may automatically be escalated to maximum prompt level. The method 1100 may then repeat at step 1104.

If the prompt level is determined to be at maximum prompt at 1110, a determination of whether to end the interactive tutorial is made at 1112. If a determination is made to not end the interactive tutorial, the method 1100 may repeat at 1104. If a determination is made to end the interactive tutorial, the method 1100 may end.

When minimal prompting is utilized in the interactive tutorial, minimal hints, cues, and prompts may be used in the interactive tutorial. For example, when the user is instructed to put toothpaste on the toothbrush, the interactive tutorial may audibly instruct the user to "Put toothpaste on the toothbrush". The interactive tutorial may then wait for an input or response from the user. For example, the camera may detect movement by the user. In another example, interactive tutorial may detect movement by the user via motion-sensor devices attached to the user's body. In still another example, the user may select the toothpaste and toothbrush using a display, such as a touch screen display, or an input device, such as a mouse. In yet another example, the microphone may detect an audio response from the user.

If no input is received after a predetermined period of time, the instructions may be repeated. In one embodiment, the instructions may be a repeat of the exact or similar instructions that was previously presented. In another embodiment, the instructions may be reworded differently as new instructions. For example, the repeated instructions may be: "Put the toothpaste in one hand and the toothbrush in the other hand."

In one embodiment, the predetermined period of time may be between about 2 seconds to 2 minutes. In another embodiment, the predetermined period of time may be between about 1 second to 5 minutes. In yet another embodiment, the predetermined period of time may be between about 0.5 seconds to 10 minutes.

If no input is received after the predetermined period of time and after a predetermined number of times the instructions were repeated, the interactive tutorial may be escalated to the next prompt level, moderate prompting. Moderate prompting may include additional hints and/or answers for the user. For example, a moderate prompt may show the user what the toothpaste and toothbrush are. This may be achieved by any known means. For example, when the audible instruction says: "Put toothpaste", the image of the toothpaste may be highlighted, the image of the toothpaste may be brought forward, the outline of the toothpaste may be bolded and/or flashed, the entire toothpaste image may blink and/or flash, the color of the toothpaste may change, the background may gray out leaving only the toothpaste image visible, or any other similar methods to highlight the toothpaste to make it stand out. In one embodiment, a pop-up window with an image of the toothpaste may be used to further visually illustrate to the user what the toothpaste is. In yet another embodiment, a video may be presented to the user to illustrate the skill. The video may, in one example, be presented in a pop-up window. The video may, in another example, be presented in at least a portion of the display or on the entire display.

Interactive tutorial may then wait for a predetermined period of time to determine if the user selected the toothpaste. If no input is received after a predetermined period of time, the instructions may be repeated. In one embodiment, the instructions may be a repeat of the exact or similar instructions that was previously presented. In another embodiment, the instructions may be reworded differently as new instructions. For example, the repeated instructions may be: "Put the toothpaste in one hand."

In one embodiment, the predetermined period of time may be between about 2 seconds to 2 minutes. In another embodiment, the predetermined period of time may be between about 1 second to 5 minutes. In yet another embodiment, the predetermined period of time may be between about 0.5 seconds to 10 minutes.

If the interactive tutorial determines that the user selected the proper product, namely the toothpaste, the instructions may then be: "on the toothbrush". The image of the toothbrush may be highlighted, the image of the toothbrush may be brought forward, the outline of the toothbrush may be bolded and/or flashed, the entire toothbrush image may blink and/or flash, the color of the toothbrush may change, the background may gray out leaving only the toothbrush image visible, or any other similar methods to highlight the toothbrush to stand out. In one embodiment, a pop-up window with an image of the toothbrush may be used to further visually illustrate to the user what the toothbrush is. In yet another embodiment, a video may be presented to the user to illustrate the skill. The video may, in one example, be presented in a pop-up window. The video may, in another example, be presented in at least a portion of the display or on the entire display.

Interactive tutorial may then wait for a predetermined period of time to determine if a response from the user selecting the toothbrush is received. If no input is received after a predetermined period of time, the instructions may be repeated. In one embodiment, the instructions may be a repeat of the exact or similar instructions that was previously presented. In another embodiment, the instructions may be reworded differently as new instructions. For example, the repeated instructions may be: "Put the toothbrush in the other hand."

In one embodiment, the predetermined period of time may be between about 2 seconds to 2 minutes. In another embodiment, the predetermined period of time may be between about 1 second to 5 minutes. In yet another embodiment, the predetermined period of time may be between about 0.5 seconds to 10 minutes.

If no input is received after the predetermined period of time and after a predetermined number of times the instruction was repeated, the prompt level may escalate to the next prompting level, maximum prompting. Maximum prompting may include use of another virtual character, such as a personal assistant, to assist the user in completing the interactive tutorial. In one embodiment, the virtual assistant may be the user's doctor or counselor. In another embodiment, the virtual assistant may be the user's parent or friend. Any virtual assistant may be used to assist the user when maximum prompting is escalated.

When the prompting is escalated to maximum prompting, the user may interact with the virtual assistant to ask questions and/or ask for assistance. Virtual assistant may respond to the user's questions, actions, or motions, model the skill to be learned to teach or re-teach the user how to complete the skill, or physically assist the virtual user how to complete the skill. In another embodiment, the virtual assistant may also help the user similar to a personal assistant by managing the user's daily calendar, providing reminders, such as reminding the user when to take medications and/or injections, make phone calls, and/or conduct any daily activities needed or asked by the user.

By modeling the skill to be learned, the user may learn through mimicking the actions of the virtual assistant. For example, the virtual assistant may take one of the virtual user's hand to grab the toothpaste and say, "Put toothpaste". In one embodiment, a pop-up picture or video of the specific action or skill may also be presented to closer illustrate how to perform the skill or task. In this example, the picture of video may show a pop-up window illustrating a closer view of the virtual assistant holding the virtual user's hand to grasp the toothpaste. Maximum prompting may show, teach, or re-teach the user what a toothpaste is.

The virtual assistant may then take the other virtual user's hand to grab the toothbrush and say, "on the toothbrush". In one embodiment, a pop-up picture or video of the specific action or skill may also be presented with a closer view or illustration of how to perform the skill or task. In this example, the video may show the virtual assistant holding the virtual user's hand to grasp the toothbrush. This will show, teach, or re-teach the user what a toothbrush is. The instructions may be spoken by the virtual assistant to coach the virtual user through the steps. In another embodiment, the instructions may be presented by a third party, such as the computing device or another virtual character.

Although the virtual assistant is described as being used with moderate and maximum prompting, this is not intended to be limiting as the virtual assistant may be used at any time throughout use of the interactive tutorial. In one embodiment, at any time during the interactive tutorial, the user may request the virtual assistant. For example, the user may say: "Miss Rubalcaba, can you please help me" and the virtual assistant (having an appearance similar to Miss Rubalcaba) may appear to assist the user. In another example, the user may say: "I need you to show me how to do that again, Mr. Mina" and the virtual assistant (having an appearance similar to Mr. Mina) may appear and show the user how to complete the task.

Through the use of escalated prompts, multiple senses such as visual, auditory, and tactile, kinesthetic, and proprioceptive senses, and personalization of the interactive tutorial, the user may eventually independently perform the skills presented in the interactive tutorial with minimal to no prompting. The interactive tutorial may automatically adjust the skill level and/or the skills to be learned based on the user's performance, amount of time necessary to perform the skills, amount of prompting required, and/or the number of times the instructions are repeated. This allows for a higher level of thinking by the user when using the interactive tutorial.

Figure 12:
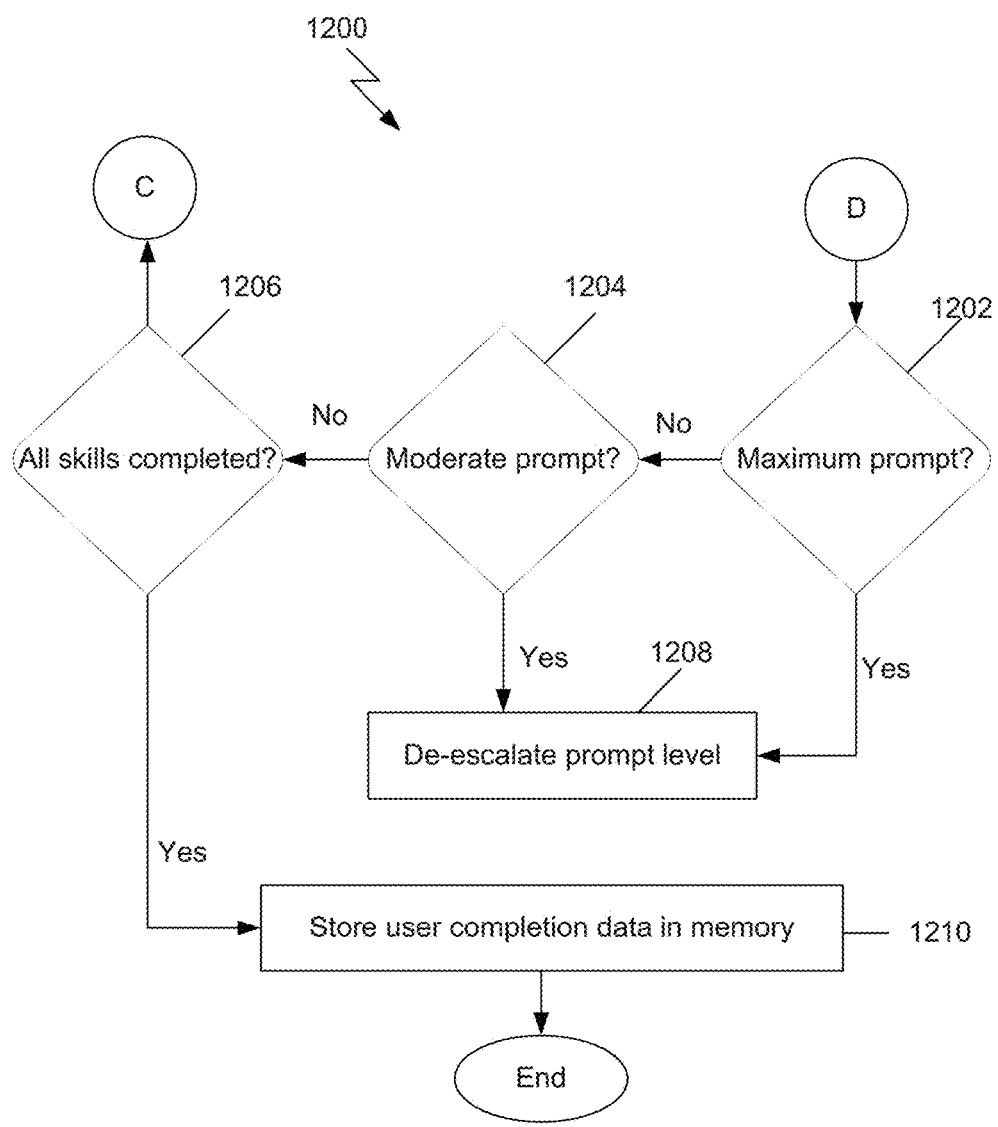
FIG. 12 illustrates a flow chart of an exemplary method of de-escalating prompts in the interactive tutorial.

FIG. 12 illustrates a flow chart of an exemplary method of de-escalating prompts in the interactive tutorial. The method 1200 may begin with a determination of whether the interactive tutorial began with maximum prompting at 1202. If it is determined that the prompt level was not at maximum prompt at 1202, a determination of whether the prompt level was at a moderate prompt level can be made at 1204. If the determination was made that the prompt level was at maximum prompt at 1202, the prompt level may automatically be de-escalated to a moderate prompt level at 1208. If the determination was made that the prompt level was a moderate prompt at 1204, the prompt level may automatically be de-escalated to minimum prompt at 1208.

If it is determined that the prompt level was not at a moderate prompt level at 1204, a determination of whether all skills were completed in the interactive tutorial at 1206. If all the skills were not completed, the method may repeat in FIG. 11. If the skills were completed at 1206, the user's interactive tutorial data may be stored in memory at 1210. The stored user data may be used to determine which interactive tutorial the user should complete next and/or the prompt level to begin the same interactive tutorial. The stored user data may also be used to determine the prompt level for future interactive tutorials. The future interactive tutorial may have a similar skill set, similar partial skill set, or may not have a similar skill set to the completed interactive tutorial.

Example 1

Examples presented herein are for exemplary purposes and are not intended to be limiting as those of ordinary skill in the art will know and understand that any skill set may be presented or taught in the interactive tutorial. For example, although illustrated for teaching teeth brushing skills, the interactive tutorial may teach speech skills.

Figure 13:
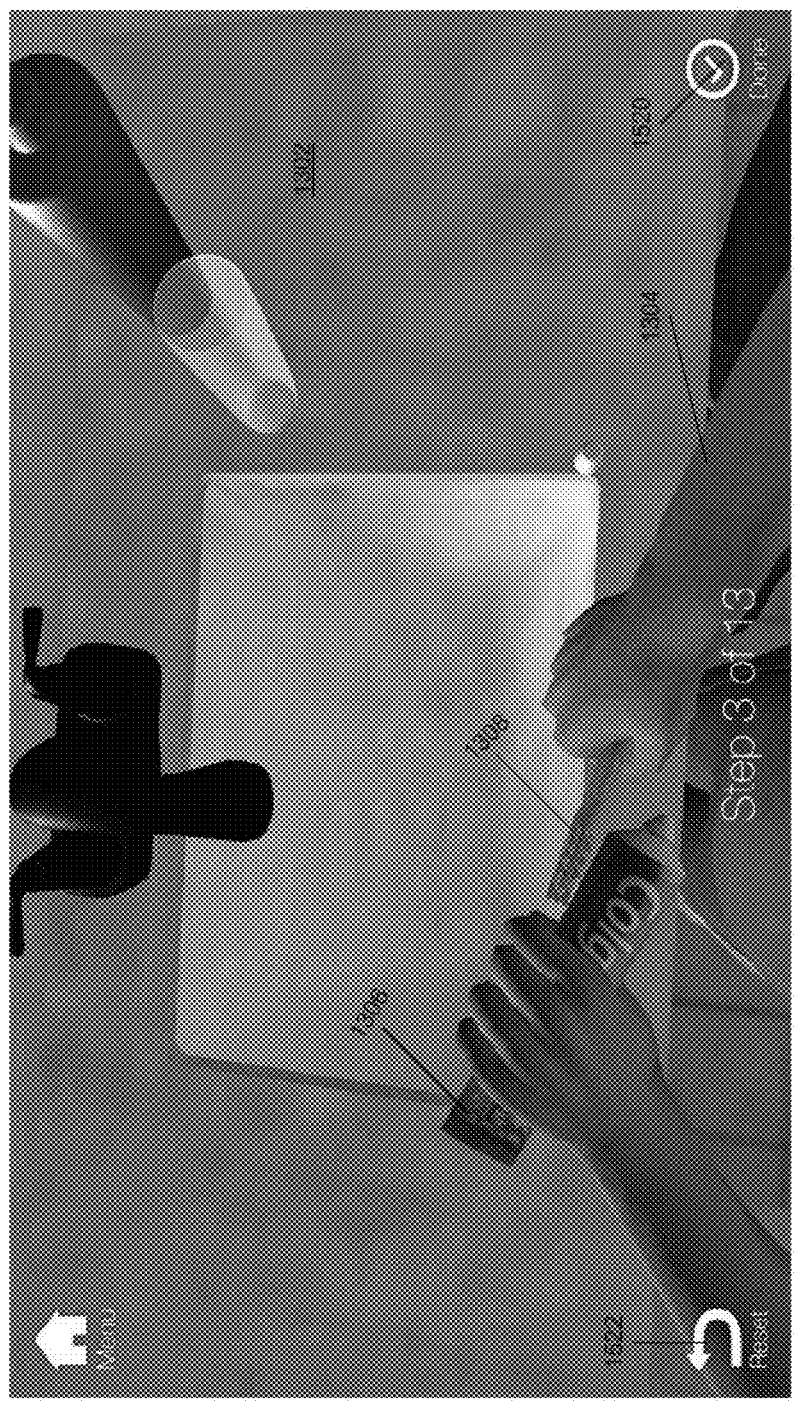
FIG. 13 illustrates an example screen shot of a minimal prompt interactive tutorial teaching teeth brushing skills.

FIG. 13 illustrates an example screen shot of a minimal prompt interactive tutorial teaching teeth brushing skills. The interactive tutorial setting or environment may be the sink area 1302 in the user's bathroom. When minimal prompting is utilized in the interactive tutorial, minimal hints, cueing and prompting may be used. For example, when the user's virtual character 1304 is instructed to put toothpaste on the toothbrush, the interactive tutorial may audibly instruct the user 1304 to "Put toothpaste on the toothbrush". The interactive tutorial may then wait for an input or response from the user 1304. For example, the camera may detect movement by the user. In another example, interactive tutorial may detect movement by the user via motion-sensor devices attached to the user's body. In still another example, the user may select the toothpaste and toothbrush using a display, such as a touch screen display, or an input device, such as a mouse. In yet another embodiment, the user 1304 may select a physical toothpaste and toothbrush, each having a motion-sensor attached thereto. The camera or sensor devices may determine whether the user properly selected the toothpaste and toothbrush.

If no input is received after a predetermined period of time, the instructions may be repeated. In one embodiment, the predetermined period of time may be between about 2 seconds to 2 minutes. In another embodiment, the predetermined period of time may be between about 1 second to 5 minutes. In yet another embodiment, the predetermined period of time may be between about 0.5 seconds to 10 minutes.

In one embodiment, the instructions may be a repeat of the exact or similar instructions that was previously presented. In another embodiment, the instructions may be reworded differently as new instructions. For example, the repeated instructions may be: "Put the toothpaste in one hand and the toothbrush in the other hand." As illustrated in the GUI, the user 1304 properly grabbed the toothpaste 1306 and toothbrush 1308. Once this task is complete, a visual check 1520 may be displayed to show the user that this skill has been perfected. If the user 1504 would like to repeat the task, the reset button 522 may be selected.

Figure 14A:
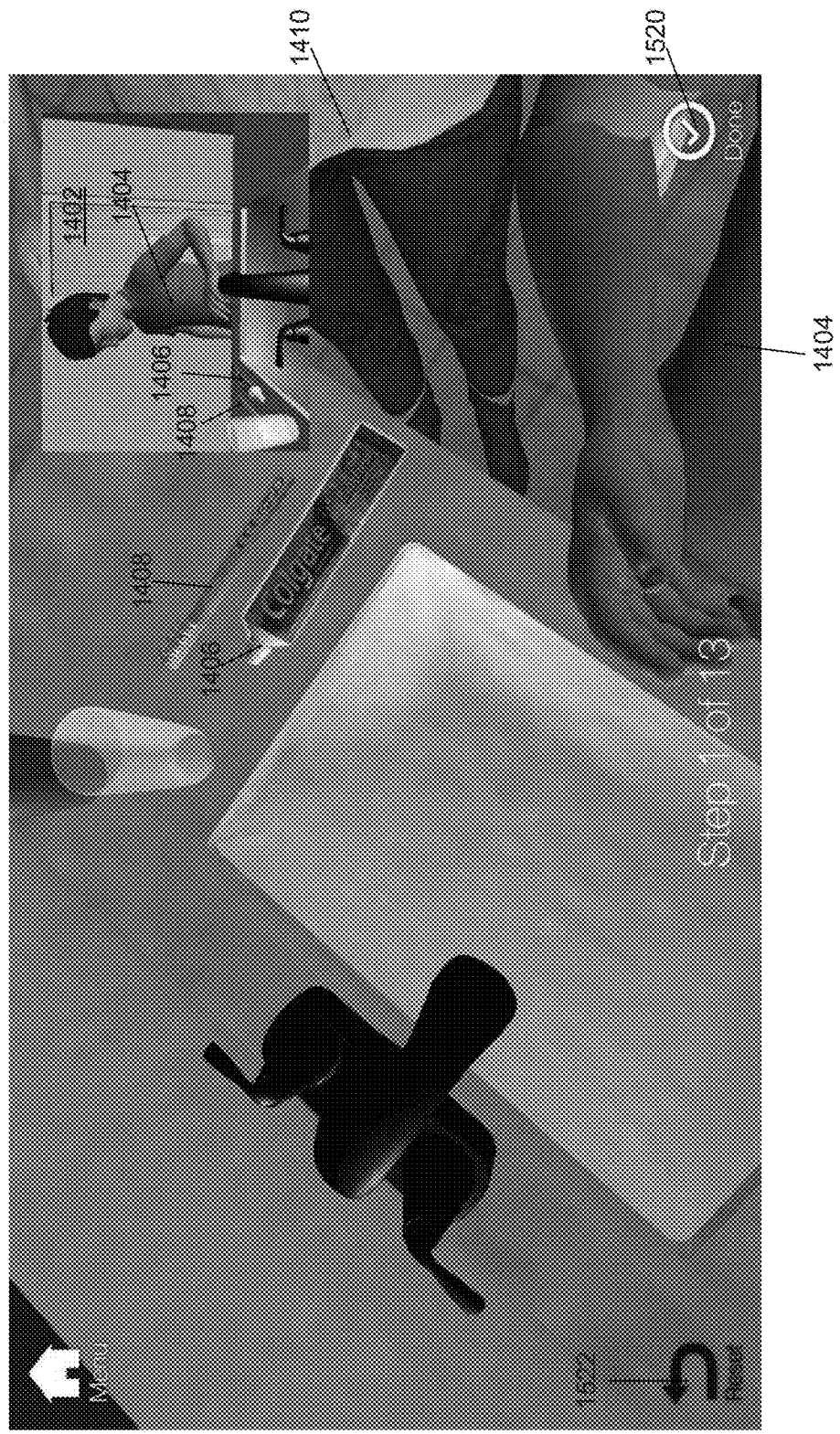
FIGS. 14A and 14B illustrate example screen shots of a moderate prompt interactive tutorial teaching teeth brushing skills.
Figure 14B:
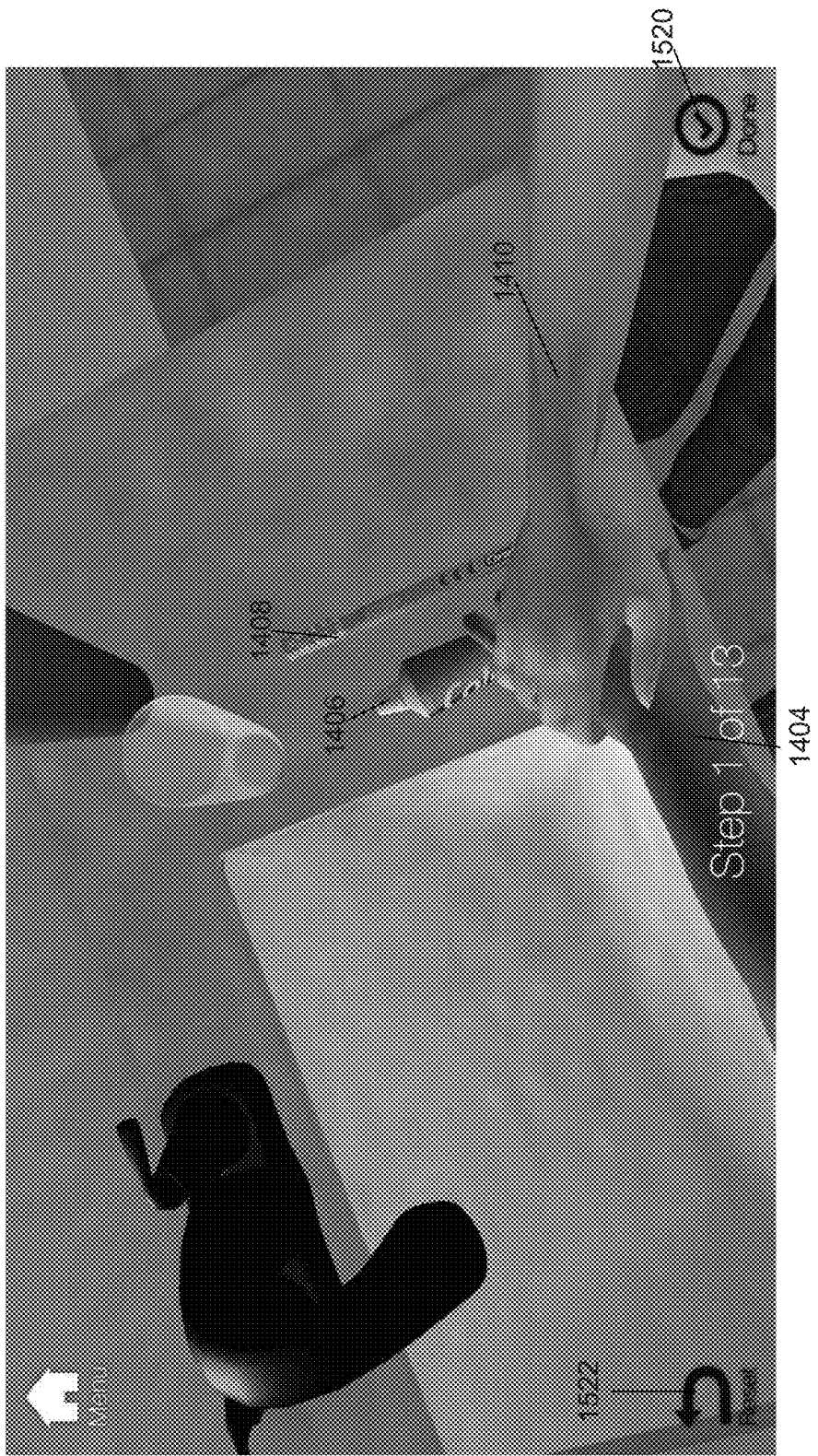

FIGS. 14A and 14B illustrate example screen shots of a moderate prompt interactive tutorial teaching teeth brushing skills. When it is determined that the prompt level should be escalated from minimum prompt to moderate prompt, additional hints, cues, or prompting may be automatically incorporated into the interactive tutorial. For example, a moderate prompt may show the user where the toothpaste and toothbrush are. This may be achieved by any known means.

Referring to FIG. 14A, a pop-up window 1402 may be used for moderate visual prompting. FIG. 14A illustrates and directs the user's virtual character 1404 to the location of where the toothbrush 1408 and toothpaste 1406 are located. As illustrated, the pop-up window illustrates the user 1404 looking in the direction of the toothpaste 1406 and toothbrush 1408. The pop-up window may show an image and/or a video showing the user how to compete the task. For example, the video may show the user where to look for the toothpaste 1406 and toothbrush 1408 while simultaneously providing audio prompting such as, "Look to the right side of the sink and you will find your toothpaste and toothbrush." Once this task is complete, a visual check 1520 may be displayed to show the user that this skill has been perfected. If the user 1504 would like to repeat the task, the reset button 522 may be selected.

As also illustrated, for example, moderate prompting may also incorporate a second virtual character 1410. The second virtual character may be the user's parents, counselor, doctor, friend, or any other desired character. Although illustrated with a second virtual character 1410, this is not intended to be limiting as any number of virtual characters may be instantiated into the interactive tutorial or no other virtual character may be instantiated into the interactive tutorial for moderate prompting.

Although illustrated with a pop-up window, the toothbrush 1408 and toothpaste 1406 may be highlighted using any known methods or means. In one embodiment, the image of the toothbrush 1408 and toothpaste 1406 may be highlighted, the image of the toothbrush 1408 and toothpaste 1406 may be brought forward, the outline of the toothbrush 1408 and toothpaste 1406 may be bolded and/or flashed, the entire toothbrush 1408 and toothpaste 1406 image may blink and/or flash, the color of the toothbrush 1408 and toothpaste 1406 may change, the background may gray out leaving only the toothbrush 1408 and toothpaste 1406 images visible, or any other similar methods to highlight the toothbrush 1408 and toothpaste 1406 to make them stand out. In another embodiment, a video may be shown in the pop-up window and/or at least a portion of the display to prompt, illustrate the skill, and/or provide hints to the user.

In still another embodiment, as illustrated in FIG. 14B, tactile prompting may be used to assist the user through the interactive tutorial. The interactive tutorial may illustrate the second virtual user 1410 taking the user's 1404 hand to grab the toothpaste 1406. While doing so, the second virtual character 1410 may repeat or say instructions such as, for example, "Grab the toothpaste", for auditory learning. The same or similar moderate tactile prompting may be repeated to obtain the toothbrush 1408. Once this task is complete, a visual check 1520 may be displayed to show the user that this skill has been perfected. If the user 1504 would like to repeat the task, the reset button 522 may be selected.

Figure 15A:
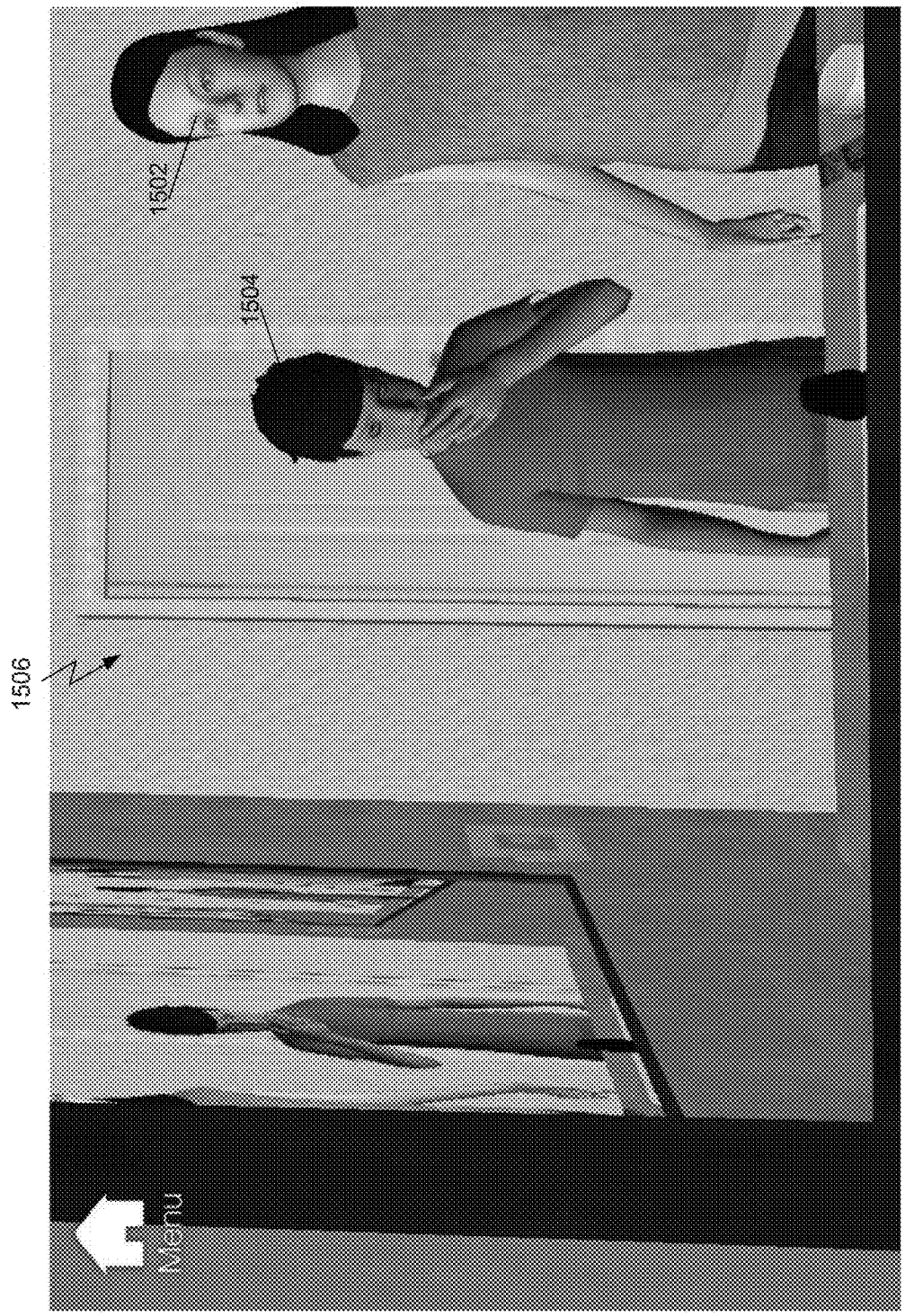
FIGS. 15A-F illustrate example screen shots of a maximum prompt interactive tutorial teaching teeth brushing skills.

FIGS. 15A-F illustrate example screen shots of a maximum prompt interactive tutorial teaching teeth brushing skills. When the prompt level is automatically escalated to and/or is set to maximum prompt level, a virtual assistant 1502, as illustrated in FIG. 15A may be used to assist the user's virtual character 1504. As illustrated in FIG. 15A, the virtual tutorial may be personalized by using an image of the user's personal bathroom 1506.

Figure 15B:
Figure 15C:
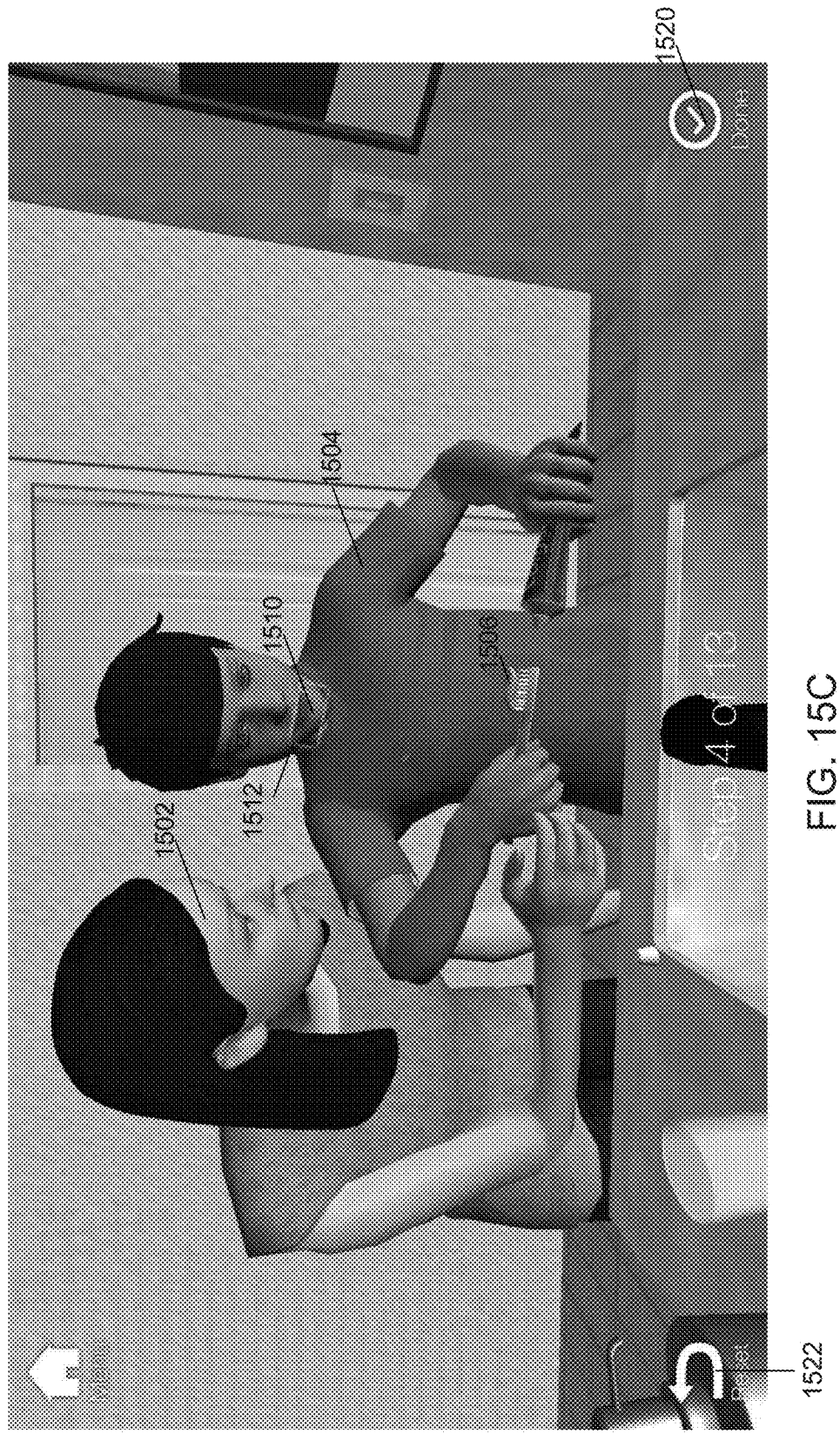

Referring to FIG. 15B, the virtual assistant 1502 may use visual, audio, and tactile prompting (not shown) to assist the user in grabbing the toothbrush 1506 and toothpaste 1508. Referring now to FIG. 15C, once the user has the toothbrush 1506 and toothpaste 1508 in hand, the virtual assistant 1502 may use visual, audio, and tactile prompting to instruct the user to put some toothpaste 1508 on the toothbrush 1506. As illustrated, the virtual assistant 1502 is holding the user's 1504 arm to assist with putting the toothpaste 1508 on the toothbrush 1506.

The virtual assistant 1502 may then instruct the user 1504 to put the toothbrush 1506 in the user's mouth 1510 to begin the process of brushing his teeth. The same tactile prompting as used above (i.e. holding the user's 1504 arm) may also be associated with this instruction. Once this task is complete, a visual check 1520 may be displayed to show the user that this skill has been perfected. If the user 1504 would like to repeat the task, the reset button 522 may be selected.

In one embodiment, to highlight the location of the user's mouth 1510, a colored shape 1512 may encircle the user's mouth 1510. The shape may be any known shape, such as a square as illustrated in FIG. 15C. However, a circle, triangle, diamond, and any other shape may be used. Furthermore, any color may be used to highlight the mouth 1510, such as a neon color, red, yellow, or any other color.

Figure 15D:

Referring now to FIG. 15D, a pop-up box 1512 may be used to visually and audible illustrate how to brush teeth. In one example, the pop-up box 1512 may be an illustration of the user's teeth 1514 to show where to place the toothbrush 1506. In another example, the pop-up box 1512 may be a video to visually and audibly show the user 1504 how to brush his teeth 1514 and what it would sound like. With maximum prompting, the steps may broken down into micro-steps to show the user each and every motion necessary to complete the skills to be learned. Once this task is complete, a visual check 1520 may be displayed to show the user that this skill has been perfected. If the user 1504 would like to repeat the task, the reset button 522 may be selected.

Figure 15E:
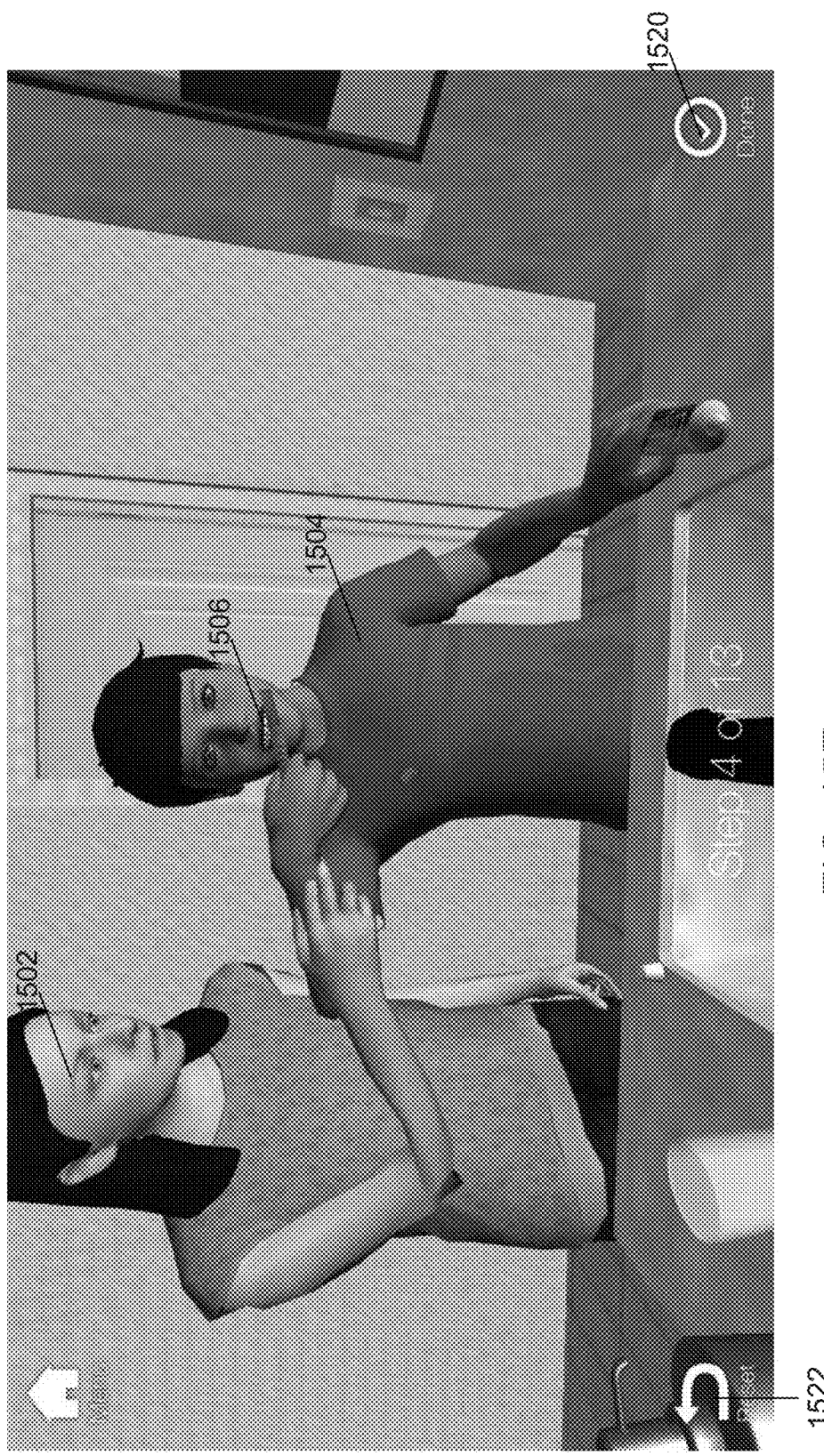

Referring now to FIG. 15E, the virtual assistant may instruct the user to, "Put your toothbrush in your mouth to brush your teeth." If no input is received by the interactive tutorial (i.e. a motion detecting the user brushing his teeth received via motion-sensing devices, a mouse, or movement on the touch screen) after a predetermined period of time, the virtual assistant 1502 may use tactile prompting to push the user's 1504 hand holding the toothbrush toward the user's 1504 mouth. The instructions may also be repeated as the virtual assistant 1502 is performing the tactile prompt. Once this task is complete, a visual check 1520 may be displayed to show the user that this skill has been perfected. If the user 1504 would like to repeat the task, the reset button 522 may be selected.

Figure 15F:
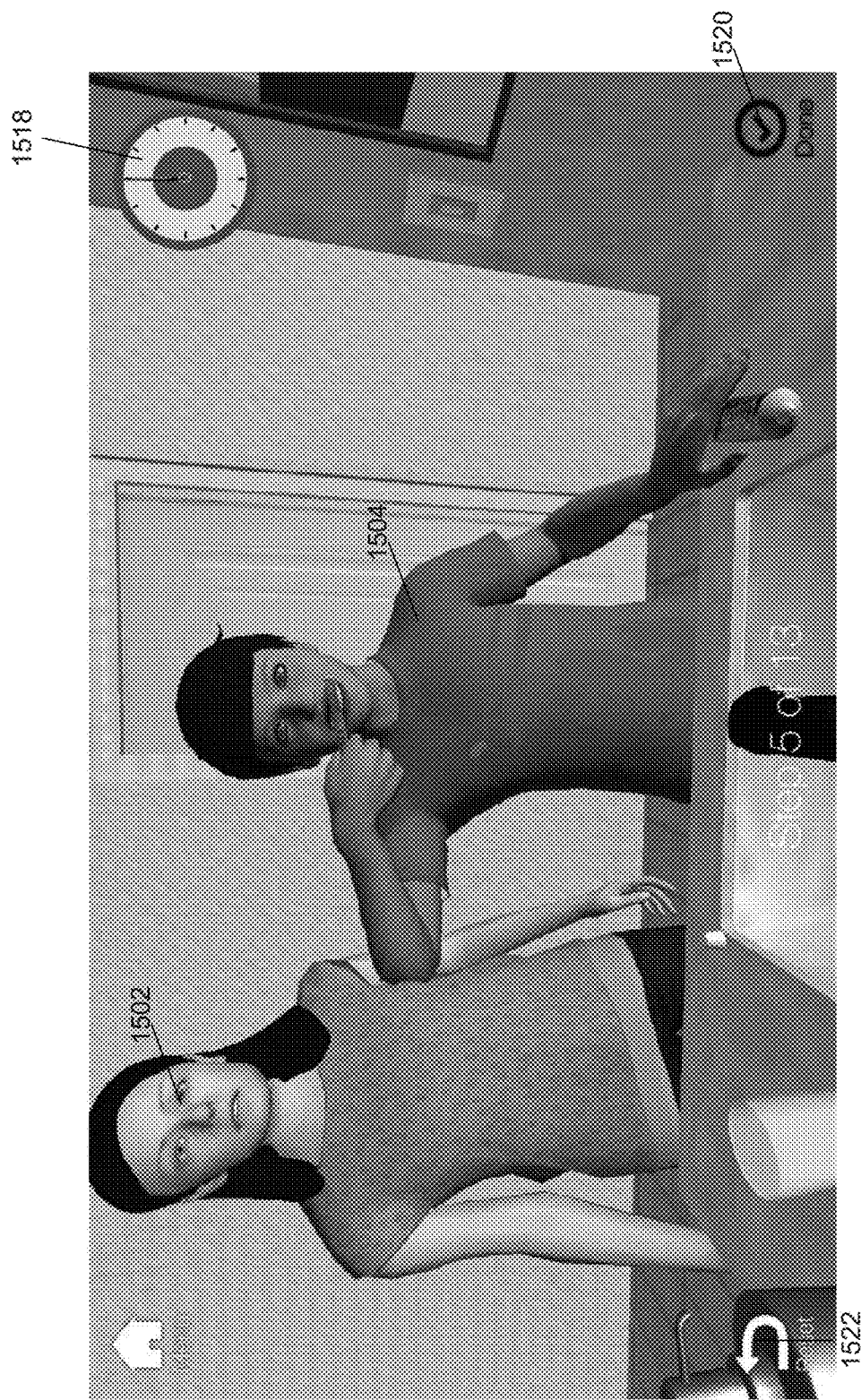

Referring now to FIG. 15F, the virtual assistant 1502 may instruct the user 1504 to brush his teeth for a predetermined period of time. The predetermined period of time may be between 30 seconds to 1.5 minutes. In another example, the predetermined period of time may be between 10 seconds to 2.5 minutes. In still another example, the predetermined period of time may be between 5 seconds to 5 minutes. A clock 1518 may be presented on the GUI to visually and audibly (i.e. sounds of a clock ticking) show the user how much time he has left to brush his teeth. Once this task is complete, a visual check 1520 may be displayed to show the user that this skill has been perfected. If the user 1504 would like to repeat the task, the reset button 522 may be selected.

Example 2

The example script presented herein is for exemplary purposes and is not intended to be limiting as those of ordinary skill in the art will know and understand that any skill set may be presented or taught and any type or types of prompting may be presented in the interactive tutorial. For example, although illustrated with specific scripts to use in an interactive tutorial, this is not intended to be limiting as any script may be used, any virtual character may be speak the script, and the like.

Skill to be learned: navigate at least one morning routine, which includes waking up, going to the bathroom, brushing teeth, washing face, and getting dressed.

Setting or Environment: Child's bedroom in a family home. The bedroom door is open and the interior of the child's bedroom is displayed complete with bedroom furniture such as a bed, dresser desk, closet, toys, and the like.

Scene: Virtual assistant enters room. The virtual assistant may guide the player through the various learning environments, coach the player through various modeling of the skills and steps, and prompting to learn the vocabulary, language, how to act, and how to respond appropriately in a situation. The virtual assistant may use one or more of the auditory, visual, and tactile prompting to teach the player to respond and perform appropriately through the interactive tutorial. The level of prompting may increase with complexity depending on the input by the player during the interactive tutorial.

Virtual Assistant: "This is your bedroom. This is where we wake up and start our day. We need to follow our morning routine so we can leave the house and go to places such as school, do shopping, and visit family, friends and other places. Today we are going to practice waking up and washing your face. Before we begin to practice being successful with navigating our morning routine, let us watch and see you doing this activity correctly. (Virtual assistant leaves the screen or room).

A teaching video rehearsing how to successfully perform the morning routine of waking up and washing his face begins. The teaching video shows the player how to perform the skills properly without any user interaction prior to the player playing the interactive tutorial. In one embodiment, audio, visual, and tactile prompts may be used throughout the video.

Setting: Player's bedroom. Player is in bed and begins to wake up. A virtual parent enters the room and greets the player.

Parent: "Good Morning Son." Parent hugs and kisses the player.

Player: "Good Morning mom." Player hugs the parent back.

The player gets out of bed and both parent and player exit the room and head towards the bedroom. The parent may stand in the doorway as the player proceeds to the bathroom to begin the bathroom routine.

Setting: The bathroom is a replica of the player's bathroom at home, which includes a mirror, sink, shower/tub and toilet.

Player: "To wash my face, I need a washcloth and a towel. I then turn on the faucet. I take the washcloth and place it under the running water. Then, I need to wring out the washcloth so that it is not too wet. Next, I put the washcloth on my face and clean my face. When I am done, I take a dry towel and dry my face. I then place the washcloth and towel back on the towel rack."

The player performs the acts as the audible instructions are provided. This is the end of the video or tutorial showing the player how to properly perform the tasks in the interactive tutorial.

The virtual assistant returns to the screen.

Virtual Assistant: "What you just viewed is how you correctly navigate the morning routine of waking up and washing your face. Now we are going to practice together and I will help you along the way. Let's begin."

Scene: Player's bedroom. Player is in bed and begins to wake up. A virtual parent enters the room to greet the player. The virtual assistant is also in the room near the player to facilitate correct navigation of the skills to be learned.

Parent: "Good Morning Son."

Player: The player should respond with "Good morning mom". The interactive tutorial will wait for a predetermined period of time for the player to respond. A microphone on the device used by the player may receive the input or response. After a predetermined period of time, for example, 5 seconds, minimum prompting will begin.

Parent: "Good Morning Son."

The interactive tutorial will again wait for a predetermined period of time for the player to respond. A microphone on the device used by the player may receive the input or response. After a predetermined period of time, for example, 5 seconds, moderate prompting will begin. The virtual assistant may intervene with at least one prompt, cue, hint, or model the skill to teach the player how to respond appropriately. For example, the virtual assistant may model the skill and say "Good Morning, mom".

The interactive tutorial will wait for a predetermined period of time for the player to respond. A microphone on the device used by the player may receive the input or response. After a predetermined period of time, for example, 5 seconds, the virtual assistant may try another prompt. For example, the virtual assistant may again model the skill, but at an increased volume.

After a predetermined number of repeats or moderate prompting, and the player still does not respond appropriately, maximum prompting can begin. The virtual assistant can perform at least one maximum prompt such as repeat the model skill with an even higher volume and/or have the player slowly repeat each word: "Good Morning, mom".

Once this task has been learned, the player gets out of bed and both parent and player exit the room and head towards the bedroom. The parent may stand in the doorway as the player and virtual assistant proceeds to the bathroom to begin the bathroom routine of washing his face.

Setting: A replica of the user's bathroom a home, which includes a mirror, sink, shower/tub and toilet.

Virtual Assistant: "What is the first thing you do when you wash your face?"

Player: The player should say, "I need a washcloth, towel, and turn on the faucet." The interactive tutorial will wait for a predetermined period of time for the player to respond. A microphone on the device used by the player may receive the input or response. After a predetermined period of time, for example, 5 seconds, minimum prompting will begin.

Virtual Assistant: "What is the first thing you do when you wash your face?"

The interactive tutorial will again wait for a predetermined period of time for the player to respond. A microphone on the device used by the player may receive the input or response. After a predetermined period of time, for example, 5 seconds, moderate prompting will begin. The virtual assistant may intervene with at least one prompt, cue, hint, or model the skill to teach the player how to respond appropriately. For example, the virtual assistant may model the skill.

Virtual Assistant: "I need a washcloth, towel, and turn on the faucet."

The interactive tutorial will wait for a predetermined period of time for the player to respond. A microphone on the device used by the player may receive the input or response. After a predetermined period of time, for example, 5 seconds, the virtual assistant may try another prompt. For example, the virtual assistant may again model the skill, but at an increased volume.

After a predetermined number of repeats or moderate prompting, and the player still does not response appropriately, maximum prompting can begin. In one prompt, the virtual assistant and perform at least one maximum prompt such as repeat the model skill with an even higher volume and/or have the player slowly repeat each word: "I need a washcloth, towel, and turn on the faucet." In another prompt, the virtual assistant may motion the player toward the location of the washcloth and towel. In yet another prompt, the virtual assistant may take the player's hand to grab the washcloth and towel and then turn on the faucet. Once this skill has been learned, the interactive tutorial may continue.

Virtual Assistant: "How do you wash your face?"

Player: The player should say: "I need to turn on the faucet, and take the washcloth and place in under the running water. Then I need to wring out the washcloth so that it is not to wet. Then I put the washcloth on my face and clean my face. When I'm done I take the dry towel and dry my face." A microphone on the device used by the player may receive the input or response. After a predetermined period of time, for example, 5 seconds, minimum prompting will begin.

Virtual Assistant: "How do you wash your face?"

The interactive tutorial will again wait for a predetermined period of time for the player to respond. A microphone on the device used by the player may receive the input or response. After a predetermined period of time, for example, 5 seconds, moderate prompting will begin. The virtual assistant may intervene with at least one prompt, cue, hint, or model the skill to teach the player how to respond appropriately. For example, the virtual assistant may model the skill and perform the acts of turning on the faucet, place the washcloth in under the running water, wring out the washcloth, put the washcloth on her face and clean her face, then take a dry towel to dry her face. In another example, the virtual assistant may repeat the instructions with a higher volume. In still another example, the steps may be broken down into micro-steps. The virtual assistant may repeat one micro-step, and wait for the player to perform the micro-step before continuing. In other words, the virtual player may say, "Turn on the faucet", and wait for the player to complete this micro-step before continuing onto the next micro-step of putting the washcloth under the water.

The interactive tutorial will wait for a predetermined period of time for the player to respond. A microphone on the device used by the player may receive the input or response. In another embodiment, cameras or sensors may detect the player's motion mimicking actions of turning on the faucet, putting the washcloth under the water, and the like. After a predetermined period of time, for example, 5 seconds, the virtual assistant may try another moderate prompt.

After a predetermined number of repeats or moderate prompting, and the player still does not response appropriately, maximum prompting can begin. In one prompt, the virtual assistant and perform at least one maximum prompt such as repeat the model skill with an even higher volume and/or have the player slowly repeat each word: "I need to turn on the faucet, and take the washcloth and place in under the running water. Then I need to wring out the washcloth so that it is not to wet. Then I put the washcloth on my face and clean my face. When I'm done I take the dry towel and dry my face." In another prompt, the virtual assistant may motion the player toward the location of the faucet and open the water. In yet another prompt, the virtual assistant may take the player's hand to grab the washcloth and put it under the running water. Once these skills have been learned, the interactive tutorial may continue or end.

If the interactive tutorial is to continue, the skills may be repeated, but at a de-escalated level of prompting. For example, if a skill was successfully performed at a maximum prompt level, the interactive tutorial may be repeated at a moderate prompt level. If a skill was successfully performed at a moderate prompt level, the interactive tutorial may be repeated at a minimum prompt level. By repeating each skill at a de-escalated prompt level, the user may eventually learn each skill to perform it independently without assistant in the real-world.

While embodiments and applications of this invention have been shown and described, it would be apparent to those skilled in the art having the benefit of this disclosure that many more modifications than mentioned above are possible without departing from the inventive concepts herein. For example, different skills may be taught such as skills related to education (i.e. reading, writing, grammar, math), sports (i.e. tennis, badminton, basketball), cooking (i.e. baking, grilling, stir-fry), do-it-yourself projects (i.e. crafts, home remodeling, fixing broken things), and the like. Additionally, different scripts may be used for the interactive tutorials. Furthermore, the hints, cues, and prompting may be different from the exemplary hints, cues, and prompts discussed above.

What is claimed is:

1. An instructional method for assisting a student to learn at least one skill, the method comprising:
    receiving a selection of an interactive tutorial from a computing device associated with the student, the interactive tutorial including a plurality of images that represent a series of actions to be performed to learn the at least one skill;
    identifying a virtual environment to be used within the interactive tutorial;
    customizing the interactive tutorial to utilize the identified virtual environment;
    identifying, by a character manager, a virtual character to be instantiated in the interactive tutorial;
    presenting the interactive tutorial to the student on a display;
    receiving sensor information from at least one sensor device, the sensor information including at least one gesture performed by the student in response to the interactive tutorial;
    determining, by an interactive tutorial server, if the at least one gesture performed by the student matches the series of actions to be performed by the student in the interactive tutorial;
    monitoring, by the interactive tutorial server, an ability of the student to follow the interactive tutorial based on the determination, the monitoring being concurrent with the presenting of the interactive tutorial; and
    dynamically adapting the interactive tutorial, by the interactive tutorial server, increasing or decreasing a level of guidance based on the ability of the student to follow the interactive tutorial.

2. The instructional method as recited in claim 1, wherein the dynamically adapting the interactive tutorial comprises:

determining a prompt to be presented to the student based on the ability of the student to follow the interactive tutorial; and presenting the prompt to the student via the interactive tutorial.

3. The instructional method as recited in claim 2, wherein the prompt comprises a virtual personal assistant character that appears in the interactive tutorial along with the virtual character.

4. The instructional method as recited in claim 3, wherein the virtual personal assistant character provides guidance to the virtual character in the interactive tutorial.

5. The instructional method as recited in claim 1, wherein the monitoring comprises evaluating the ability of the student to follow the interactive tutorial based at least in part on the received sensor information.

6. The instructional method as recited in claim 1, wherein the monitoring comprises:

receiving timer information relative to at least one instruction being presented by the interactive tutorial; and evaluating the ability of the student to follow the interactive tutorial based at least in part on the received sensor information and the received timer information.

7. The instructional method as recited in claim 1, wherein the virtual character represents the student in the interactive tutorial.

8. The instructional method as recited in claim 1, wherein the virtual character is customized to have a visual appearance that resembles the student.

9. The instructional method as recited in claim 1, wherein the interactive tutorial includes a plurality of prompts for at least one instruction included in the interactive tutorial, the plurality of prompts being arranged to provide different levels of guidance.

10. The instructional method as recited in claim 9, wherein the dynamically adapting the interactive tutorial comprises:

determining an appropriate one of the plurality of prompts to be presented to the student; and presenting the determined prompt to the student via the interactive tutorial.

11. The instructional method as recited in claim 10, wherein the determining an appropriate one of the plurality of prompts further comprises escalating the plurality of prompts from the least level of guidance to the most level of guidance.

12. The instructional method as recited in claim 9, wherein the dynamically adapting the interactive tutorial comprises:

sequentially progressing through the plurality of prompts presented to the student based on the ability of the student to follow the interactive tutorial including any of the prompts previously presented.

13. A non-transitory computer readable medium including at least computer program code stored thereon for assisting a user to learn at least one skill, the non-transitory computer readable medium comprising:

computer program code for selecting an interactive tutorial, the interactive tutorial including at least (i) a plurality of images that represent a series of actions to be performed to learn the at least one skill, (ii) audio that provides instructions on performing the series of actions to be performed to least the at least one skill, and (iii) a plurality of prompts for at least one of the actions, the plurality of prompts for the at least one of the actions being arranged to provide different levels of guidance;

computer program code for identifying a virtual environment to be used within the interactive tutorial;

computer program code for customizing the interactive tutorial to utilize the identified virtual environment;

computer program code for identifying a virtual character to be instantiated in the interactive tutorial, the virtual character is learning the at least one skill;

computer program code for presenting the interactive tutorial to the user using a display and a speaker;

computer program code for monitoring an ability of the user to follow the interactive tutorial, the monitoring being concurrent with the presenting of the interactive tutorial, and the monitoring operates to monitor actions, if any, performed by the user in response to audio or visual instructions presented to the user by the interactive tutorial; and computer program code for dynamically adapting the interactive tutorial based on the ability of the user to follow the interactive tutorial, the computer program code for dynamically adapting the interactive tutorial includes at least computer program code for sequentially progressing through the plurality of prompts presented to the user to offer increasing or decreasing level of guidance based on the ability of the user to follow the interactive tutorial including any of the prompts previously presented.

14. The non-transitory computer readable medium as recited in claim 13, wherein the computer program code for monitoring comprises:

computer program code for receiving sensor information pertaining the actions, if any, performed by the user;

computer program code for receiving timer information relative to at least one audio or visual instruction presented to the user by the interactive tutorial and a resulting action, if any performed by the user; and computer program code for evaluating the ability of the user to follow the interactive tutorial based at least in part on the received sensor information and the received timer information.

15. A computing device configured to assist a user in learning a skill, the computing device comprising:

at least one data storage device that stores an electronic tutorial that contains audio instructional content and video instructional content;

a display device that presents the video instructional content;

an environment database configured to: i) identify a virtual environment to be used based on the video instructional content, and ii) customize the video instructional content to utilize the identified virtual environment;

a speaker that presents the audio instructional content;

at least one sensor device to sense actions of the user while the electronic tutorial is being presented via the display device and/or the at least one sensor device;

a prompt manager that evaluate ability of the user to perform the skill and to determine a guidance prompt to be presented to the user within the video instructional content and/or the audio instructional content, the guidance prompt being determined based on the evaluated ability of the user to perform the skill, and the evaluated ability of the user to perform the skill being based at least in part on data obtained by the at least one sensor, wherein the prompt manager sequentially progresses through the plurality of prompts presented to the user to offer increasing or decreasing level of guidance based on the ability of the user to follow the interactive tutorial including any of the prompts previously presented.

16. The computing device as recited in claim 15, wherein the guidance prompt to be presented is chosen from a plurality of guidance prompts for performing an action of the skill, and the plurality of guidance prompts over different degrees of guidance.

17. The computing device as recited in claim 15, wherein the at least one sensor comprises an image capture device.

18. The computing device as recited in claim 15, wherein the at least one sensor comprises a wireless sensor that provides movement indicia pertaining to the user.

19. The computing device as recited in claim 15, wherein the computing device comprises:
   a character manager that enables the user to identify and customize a virtual character to be instantiated in the interactive tutorial as the learner of the skill.

* * * * *